US012482051B2

(12) United States Patent
Mao et al.

(10) Patent No.: US 12,482,051 B2
(45) Date of Patent: Nov. 25, 2025

(54) METHODS AND SYSTEMS FOR VASCULAR IMAGE PROCESSING

(71) Applicant: SHANGHAI UNITED IMAGING HEALTHCARE CO., LTD., Shanghai (CN)

(72) Inventors: Yufei Mao, Shanghai (CN); Xiong Yang, Shanghai (CN); Zhenhuan Gong, Shanghai (CN); Saisai Su, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 324 days.

(21) Appl. No.: 18/148,402

(22) Filed: Dec. 29, 2022

(65) Prior Publication Data

US 2023/0214952 A1 Jul. 6, 2023

(30) Foreign Application Priority Data

Dec. 31, 2021 (CN) .......................... 202111675308.2
Dec. 31, 2021 (CN) .......................... 202111678599.0
Mar. 10, 2022 (CN) .......................... 202210236024.1

(51) Int. Cl.
*G06T 1/00* (2006.01)
*G06T 7/11* (2017.01)
*G06T 7/33* (2017.01)

(52) U.S. Cl.
CPC .............. *G06T 1/0007* (2013.01); *G06T 7/11* (2017.01); *G06T 7/344* (2017.01); *G06T 2207/30101* (2013.01)

(58) Field of Classification Search
CPC ......... G06T 1/0007; G06T 7/11; G06T 7/344; G06T 2207/30101; G06T 7/0012; G06T 2207/10088; G06T 7/62; G06T 2207/10116; G06T 7/10;
(Continued)

(56) References Cited

U.S. PATENT DOCUMENTS 9,767,557 B1 * 9/2017 Gulsun ............ G06V 30/19173
9,984,465 B1 * 5/2018 Ma ........................ G06T 7/0016
10,762,637 B2 9/2020 Gulsun et al.
(Continued)

FOREIGN PATENT DOCUMENTS

CN 104794708 A 7/2015
CN 110223271 A 9/2019
(Continued)

OTHER PUBLICATIONS

"Semi-automated Measurement of Vascular Curvature and Its Influence on Thrombectomy Treatment", Web page <https://www.brainmed.com/info/detail?id=19243>, Dec. 14, 2020.
(Continued)

*Primary Examiner* — Oneal R Mistry
*Assistant Examiner* — Jongbong Nah
(74) *Attorney, Agent, or Firm* — METIS IP LLC

(57) ABSTRACT

The present disclosure relates to methods and systems for vascular image processing. The method may include obtaining an initial vascular image, generating a vascular fragment image by performing a vascular fragmentation operation on the initial vascular image, and generating, based on the vascular fragment image, a vascular centerline image.

20 Claims, 16 Drawing Sheets

(58) Field of Classification Search
CPC . G06T 2207/10072; G06T 2207/10132; G06T 2207/20084; G06T 2207/30172
See application file for complete search history.

(56) References Cited

U.S. PATENT DOCUMENTS

| | | | | |
|---|---|---|---|---|
| 2006/0036167 | A1* | 2/2006 | Shina | A61B 6/12 600/433 |
| 2016/0247279 | A1* | 8/2016 | Lavi | A61B 6/503 |
| 2017/0258433 | A1* | 9/2017 | Gulsun | A61B 6/5217 |
| 2021/0298706 | A1 | 9/2021 | Tu et al. | |
| 2022/0164957 | A1* | 5/2022 | Jia | G16H 50/20 |
| 2023/0095242 | A1* | 3/2023 | Liu | A61B 6/481 345/419 |

FOREIGN PATENT DOCUMENTS

| | | |
|---|---|---|
| CN | 110349143 A | 10/2019 |
| CN | 110428417 A | 11/2019 |
| CN | 111598891 A | 8/2020 |
| CN | 111681226 A | 9/2020 |
| CN | 112308874 A | 2/2021 |
| CN | 112561781 A | 3/2021 |
| CN | 113066091 A | 7/2021 |
| CN | 113160189 A | 7/2021 |
| CN | 113223015 A | 8/2021 |
| CN | 113592764 A | 11/2021 |
| CN | 113962952 A | 1/2022 |
| WO | 2021249439 A1 | 12/2021 |

OTHER PUBLICATIONS

"Multimodal Medical Image Fusion", Web page <https://blog.csdn.net/dawnyi_yang/article/details/118929581>, Jul. 20, 2021.

Cheng, Shiyin et al., Centerline Extraction from MR Carotid Angiography Images, Chinese Journal of Stereology and Image Analysis, 21(4): 415-422, 2016.

The Extended European Search Report in European Application No. 22217344.5 mailed on Jun. 1, 2023, 9 pages.

He, Jiafa et al., Learning Hybrid Representations for Automatic 3D Vessel Centerline Extraction, International Conference on Medical Image Computing and Computer-Assisted Intervention, 2020, 11 pages.

Wei, Mingqiang et al., Centerline Extraction of Vasculature Mesh, IEEE Access, 6: 10257-10268, 2018.

The Second Office Action in Chinese Application No. 202111678599.0 mailed on Aug. 1, 2025, 10 pages.

The Second Office Action in Chinese Application No. 202210236024.1 mailed on Sep. 17, 2025, 18 pages.

* cited by examiner

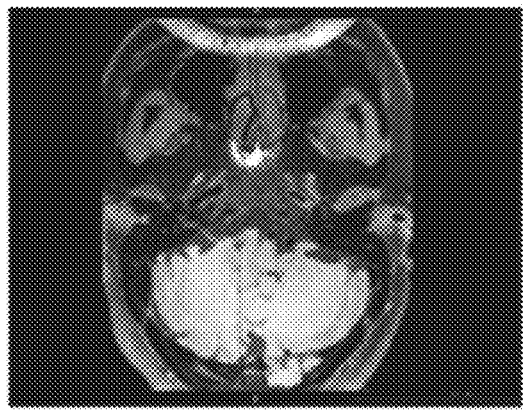 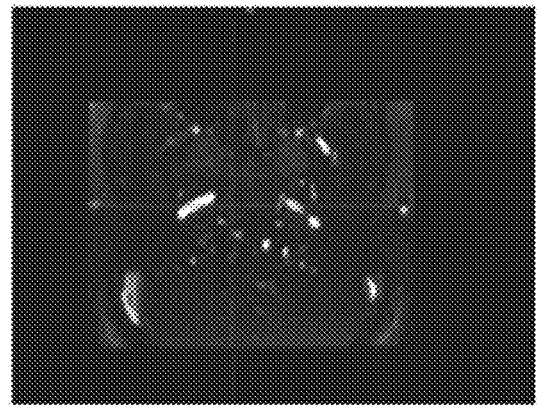
FIG. 8A  FIG. 8B
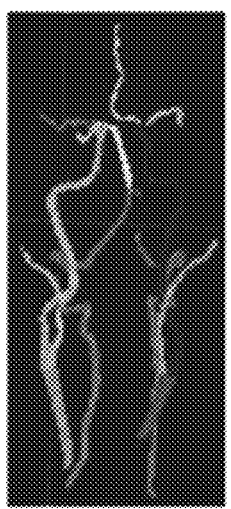 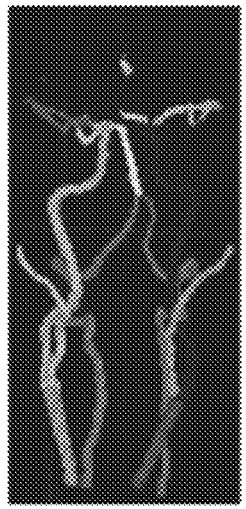 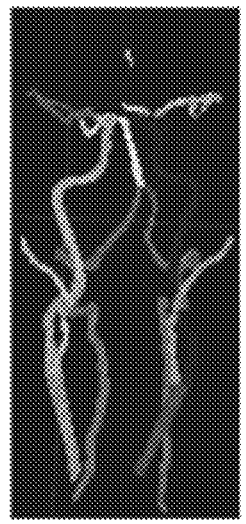
FIG. 9A  FIG. 9B  FIG. 9C

1300

```
┌─────────────────────────────────────────┐
│ Determining at least one vascular branch point │
│ based on a vascular centerline image and a     │ ∿ 1302
│         vascular fragment image                │
└─────────────────────────────────────────┘
                    │
                    ▼
┌─────────────────────────────────────────┐
│ Generating a vascular centerline fragment image │
│ by performing a fragmentation operation on each │
│  vascular centerline in the vascular centerline │ ∿ 1304
│   image based on the at least one vascular branch │
│                   point                          │
└─────────────────────────────────────────┘
```

FIG. 13

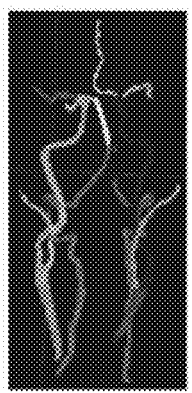 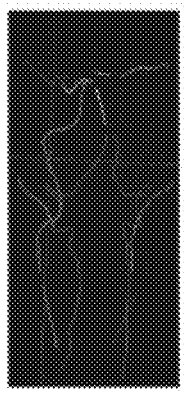 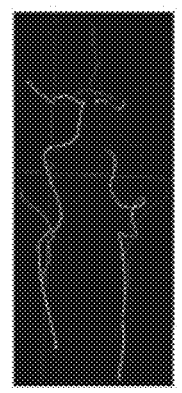 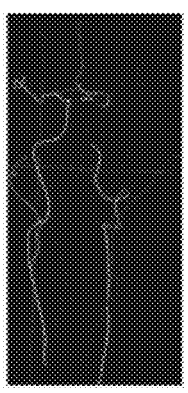 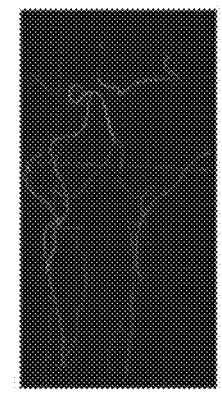
FIG. 18A　　FIG. 18B　　FIG. 18C　　FIG. 18D　　FIG. 18E
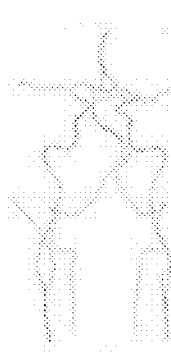 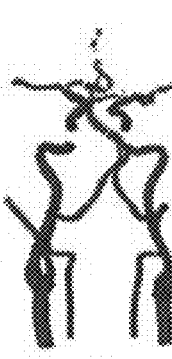 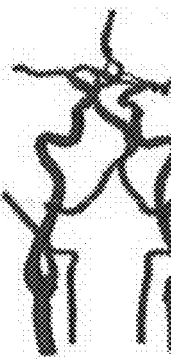  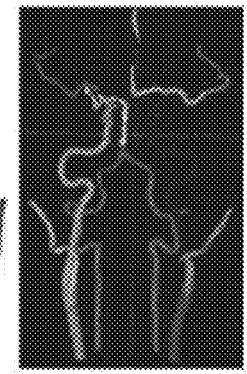
FIG. 18F　　FIG. 18G　　FIG. 18H　　FIG. 18I　　FIG. 18J

METHODS AND SYSTEMS FOR VASCULAR IMAGE PROCESSING

CROSS-REFERENCE TO RELATED APPLICATIONS

This application claims priority to Chinese Patent Application No. 202111675308.2, filed on Dec. 31, 2021, Chinese Patent Application No. 202111678599.0, filed on Dec. 31, 2021, and Chinese Patent Application No. 202210236024.1, filed on Mar. 10, 2022, the entire contents of each of which are hereby incorporated by reference.

TECHNICAL FIELD

The present disclosure generally relates to image processing, and more particularly, relates to methods and systems for vascular image processing.

BACKGROUND

In recent years, the morbidity and mortality of vascular diseases continuously increase year by year. An extraction of a vascular centerline is of great significance to the diagnosis and treatment of vascular disease. How to extract a vascular centerline accurately has become an urgent problem to be solved.

Thus, it is desirable to provide methods and systems for vascular image processing, which improves an accuracy of the extraction of a vascular centerline from a vascular image.

SUMMARY

According to an aspect of the present disclosure, a method for image processing is provided. The method may include obtaining an initial vascular image, generating a vascular fragment image by performing a vascular fragmentation operation on the initial vascular image, and generating, based on the vascular fragment image, a vascular centerline image.

In some embodiments, the generating a vascular fragment image by performing a vascular fragmentation operation on the initial vascular image may include generating the vascular fragment image by processing the initial vascular image based on a first vascular segmenting model.

In some embodiments, the method further may include determining, based on the vascular centerline image and the initial vascular image, a plurality of vascular sectional images corresponding to a plurality of vascular sections. For each of the plurality of vascular sections, the method may also include generating a vascular wall segmentation image by processing the vascular sectional image of the vascular section based on a vascular wall segmentation model, and generating, based on the vascular wall segmentation image corresponding to each of the plurality of vascular sections, a three-dimensional vascular wall image.

In some embodiments, the determining, based on the vascular centerline image and the initial vascular image, a plurality of vascular sectional images corresponding to a plurality of vascular sections may include determining, based on the vascular centerline image, a plurality of sectional points on at least one vascular centerline in the initial vascular image. For each of the plurality of sectional points, the method may also include determining one or more neighbor pixels of the sectional point in the initial vascular image, and determining, based on the one or more neighbor pixels of the sectional point, the vascular sectional image corresponding to the vascular section where the sectional point is located.

In some embodiments, the generating, based on the vascular wall segmentation image corresponding to the vascular section, a three-dimensional vascular wall image may include for the each of the plurality of vascular sections, reconstructing, based on the vascular wall segmentation image of the vascular section, a two-dimensional vascular wall image corresponding to the vascular section. The method may also include for each of a plurality of pairs of adjacent vascular sections of the plurality of vascular sections, generating, based on two-dimensional vascular wall images corresponding to the pair of adjacent vascular sections, an initial three-dimensional vascular wall image. The method may further include generating, based on the initial three-dimensional vascular wall images of the plurality of pairs of the adjacent vascular sections, the three-dimensional vascular wall image.

In some embodiments, the initial vascular image may include a black blood image and a bright blood image. The generating a vascular fragment image by performing a vascular fragmentation operation on the initial vascular image may include generating a first vascular fragment image by performing the vascular fragmentation operation on the black blood image, and generating a second vascular fragment image by performing the vascular fragmentation operation on the bright blood image. The generating, based on the vascular fragment image, a vascular centerline image may include generating, based on the first vascular fragment image and the second vascular fragment image, a fused vascular fragment image, and generating, based on the fused vascular fragment image, a vascular centerline image of the black blood image and/or a vascular centerline image of the bright blood image.

In some embodiments, the generating, based on the first vascular fragment image and the second vascular fragment image, a fused vascular fragment image may include obtaining reference information relating to vascular architecture, performing, based on the reference information, a correction operation on the first vascular fragment image and the second vascular fragment image, and generating, based on a corrected first vascular fragment image and a corrected second vascular fragment image, the fused vascular fragment image.

In some embodiments, the initial vascular image may include a black blood image and a bright blood image. The generating a vascular fragment image by performing a vascular fragmentation operation on the initial vascular image may include generating a fused vascular fragment image by processing the black blood image and the bright blood image based on a second vascular segmenting model.

In some embodiments, the vascular fragment image may include a plurality of vascular fragments. The generating, based on the vascular fragment image, a vascular centerline image may include extracting a plurality of segment centerlines of the plurality of vascular fragments of the vascular fragment image, and generating, based on the plurality of segment centerlines, the vascular centerline image.

In some embodiments, the generating, based on the plurality of segment centerlines, the vascular centerline image may include determining, based on the initial vascular image, one or more optimal routes configured to connect and extend the plurality of segment centerlines, and obtaining one or more connected centerlines by connecting the plurality of segment centerlines based on the one or more optimal routes. For each of the one or more connected centerlines, the method may also include extending, based on the one or more optimal route, a head-end and a tail-end of the connected centerline.

In some embodiments, the method may further include determining, based on the vascular centerline image and the vascular fragment image, at least one vascular branch point, and generating a vascular centerline segment image by performing a fragmentation operation on each vascular centerline in the vascular centerline image based on the at least one vascular branch point.

In some embodiments, the method may include determining, based on the initial vascular image, a plurality of vascular sectional images corresponding to a plurality of sectional points on a plurality of vascular centerlines in the vascular centerline image. For each of the plurality of vascular sectional images, the method may also include generating a vascular structure segmentation image by segmenting vascular structure from the vascular sectional image. The method may also include selecting, based on the plurality of vascular structure segmentation images corresponding to the plurality of vascular sectional images, at least one target vascular sectional image from the plurality of vascular sectional images. The vascular structure in each of the at least one target vascular sectional image may satisfy a preset condition. The method may further include generating, based on the at least one target vascular sectional image, a target vascular image.

In some embodiments, the method may further include determining, based on the vascular centerline image, whether a target tissue exists in blood vessels of the initial vascular image, and in response to the determining that the target tissue exists in the blood vessels of the initial vascular image, obtaining a segmentation image of the target tissue by segmenting the target tissue from the initial vascular image.

According to another aspect of the present disclosure, a system for image processing is provided. The system may include at least one storage device including a set of instructions and at least one processor configured to communicate with the at least one storage device. When executing the set of instructions, the at least one processor may be configured to direct the system to perform operations including obtaining an initial vascular image, generating a vascular fragment image by performing a vascular fragmentation operation on the initial vascular image, and generating, based on the vascular fragment image, a vascular centerline image.

According to yet another aspect of the present disclosure, a non-transitory computer readable medium including a set of instructions for generating a 3D image is provided. When executed by at least one processor, the set of instructions may direct the at least one processor to effectuate a method, the method may include obtaining an initial vascular image, generating a vascular fragment image by performing a vascular fragmentation operation on the initial vascular image, and generating, based on the vascular fragment image, a vascular centerline image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 8A is a schematic diagram illustrating an exemplary black blood image of a cerebrovascular according to some embodiments of the present disclosure;

FIG. 8B is a schematic diagram illustrating an exemplary bright blood image of a cerebrovascular according to some embodiments of the present disclosure;

FIG. 9A is a schematic diagram illustrating an exemplary first vascular fragment image according to some embodiments of the present disclosure;

FIG. 9B is a schematic diagram illustrating an exemplary second vascular fragment image according to some embodiments of the present disclosure;

FIG. 9C is a schematic diagram illustrating an exemplary fused vascular fragment image according to some embodiments of the present disclosure;

FIG. 13 is a flowchart illustrating an exemplary process for generating a vascular centerline fragment image according to some embodiments of the present disclosure;

FIGS. 18A to 18J are schematic diagrams illustrating an exemplary process for vascular image processing according to some embodiments of the present disclosure.

DETAILED DESCRIPTION

Figure 1:
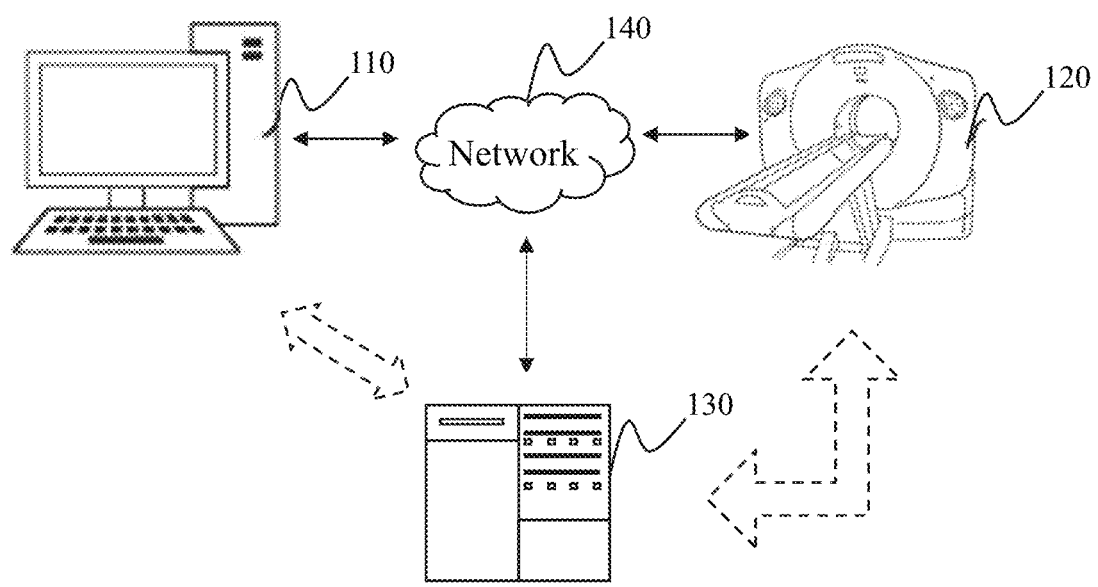
FIG. 1 is a schematic diagram illustrating an exemplary image processing system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The term "pixel" and "voxel" in the present disclosure may be used interchangeably to refer to an element in an image. The term "image" in the present disclosure may be used to refer to images of various forms, including a 2-dimensional (2D) image, a 3-dimensional (3D) image, a 4-dimensional (4D) image, etc.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

In recent years, the morbidity and the mortality of cerebrovascular diseases continuously increase year by year, which becomes one of the leading causes of death. Clinical manifestation of cerebrovascular diseases includes a stroke, which is mostly caused by atherosclerosis. Atherosclerosis may lead to abnormal blood supply to the functional areas of the brain, and untimely diagnosis and treatment may seriously affect a patient's health and subsequent quality of life. How to identify a cerebral blood vessel through medical image processing, detect a lesion region of a blood vessel, and quickly locate the lesion may be crucial for a doctor's diagnosis and the patient's subsequent treatment.

In the diagnosis of cerebrovascular diseases, main cerebral vessels need to be identified from magnetic resonance images and computed tomography images, and the lesion region may be examined based on the identified cerebral vessels to obtain a diagnosis result. Usually, blood vessels of the head and neck are displayed via a vascular lumen display manner and a maximum density projection display manner. The vascular lumen display and the maximum density projection display may provide vascular lumen information of the blood vessels on a certain degree, however, an atherosclerotic plaque may locate on a vascular wall. Thus, the vascular lumen display manner and the maximum density projection display manner can not provide a visual representation of the plaque on the vascular wall and allow for a differentiated presentation of each vascular fragment. In addition, the vascular image processing needs to extract a vascular centreline. Conventionally, the vascular centreline of a vascular image is extracted manually, which relies excessively on manual work and is cumbersome, inefficient, and difficult to repeat.

Therefore, the present disclosure provides systems and methods for vascular image processing to solve the problems mentioned above.

FIG. 1 is a schematic diagram illustrating an exemplary image processing system 100 according to some embodiments of the present disclosure. As illustrated, the image processing system 100 may include a terminal 110, an imaging device 120, a processing device 130, and a network 140. The components of the image processing system 100 may be connected in one or more of various ways. Merely by way of example, as illustrated in FIG. 1, the imaging device 120 may be connected to the processing device 130 through the network 140. As another example, the imaging device 120 may be connected to the processing device 130 directly (as indicated by the bi-directional arrow in dotted lines linking the imaging device 120 and the processing device 130). As a further example, the terminal 110 may be connected to the processing device 130 directly (as indicated by the bi-directional arrow in dotted lines linking the terminal 110 and the processing device 130) or through the network 140.

The terminal 110 may refer to a device with computing capabilities used by a user. For example, the terminal 110 may include a mobile device, a tablet computer, a laptop computer, or the like, or any combination thereof. In some embodiments, the mobile device may include a smart home device, a wearable device, a smart mobile device, a virtual reality device, an augmented reality device, or the like, or any combination thereof. In some embodiments, the terminal 110 may interact with other components of the image processing system 100 via the network 140. In some embodiments, the terminal 110 may remotely operate the imaging device 120 and/or the processing device 130. In some embodiments, the terminal 110 may receive information and/or instructions inputted by a user, and send the received information and/or instructions to the imaging device 120 or to the processing device 130 via the network 140. For example, the terminal 110 may send the received information and/or instructions to the imaging device 120 and control the imaging device 120 to scan a subject to obtain a medical image (e.g., a vascular image). In some embodiments, the terminal 110 may receive data and/or information from the processing device 130. In some embodiments, the terminal 110 may include a processing device (not shown in the figure) to perform the systems and methods for image processing in the present disclosure. In some embodiments, the terminal 110 may be part of the processing device 130. In some embodiments, the terminal 110 may be omitted.

The imaging device 120 may scan a subject located within its detection region and generate data relating to the subject. In the present disclosure, "subject" and "object" are used interchangeably. Merely by way of example, the subject may include a patient, a man-made subject, etc. As another example, the subject may include a specific portion, organ, and/or tissue of a patient. For example, the subject may include head, brain, neck, body, shoulder, arm, thorax, cardiac, stomach, blood vessel, soft tissue, knee, feet, or the like, or any combination thereof. The imaging device 120 may include a Computed Tomography (CT) imaging device, a Positron Emission Computed Tomography (PET) imaging device, a Magnetic Resonance Imaging (MRI) device, a Single-Photon Emission Computed Tomography (SPECT) imaging device, a PET-CT imaging device, a PET-MRI imaging device, a Digital subtraction angiography (DSA) imaging device, etc. In some embodiments, the imaging device 120 may include other imaging devices, such as an X-ray imaging device, a thermal imaging device, a medical optical device, or the like, or any combination thereof.

The processing device 130 may process data and/or information obtained from the terminal 110, the imaging device 120, or other components of the image processing system 100. For example, the processing device 130 may process an initial vascular image to generate a vascular fragment image and/or a vascular centerline image. As another example, the processing device 130 may generate one or more machine learning models (e.g., a vascular fragmentation model, a vascular wall segmentation model) that can be used for vascular image processing.

In some embodiments, the processing device 130 (e.g., one or more modules illustrated in FIG. 2) may execute instructions and may accordingly be directed to perform one or more processes (e.g., processes 300, 400, and 700) described in the present disclosure. For example, each of the one or more processes may be stored in a storage device as a form of instructions, and invoked and/or executed by the processing device 130.

In some embodiments, the processing device 130 may be a single server or a server group. In some embodiments, the processing device 130 may be local to or remote from the image processing system 100. Merely for illustration, only one processing device 130 is described in the image processing system 100. However, it should be noted that the image processing system 100 in the present disclosure may also include multiple processing devices. Thus operations and/or method steps that are performed by one processing device 130 as described in the present disclosure may also be jointly or separately performed by the multiple processing devices. For example, if in the present disclosure the processing device 130 of the image processing system 100 executes both process A and process B, it should be understood that the process A and the process B may also be performed by two or more different processing devices jointly or separately in the image processing system 100 (e.g., a first processing device executes process A and a second processing device executes process B, or the first and second processing devices jointly execute processes A and B).

The network 140 may include any suitable network that can facilitate the exchange of information and/or data for the image processing system 100. In some embodiments, one or more components of the image processing system 100 (e.g., the terminal 110, the imaging device 120, or the storage device (not shown in the figure)) may communicate information and/or data with one or more other components of the image processing system 100 via the network 140. For example, the processing device 130 may obtain a vascular image from the imaging device 120 via the network 140. In some embodiments, the network 140 may include one or more access points of the network 140. In some embodiments, the network 140 may be any type of wired or wireless network, or a combination thereof.

In some embodiments, the image processing system 100 may further include one or more components, for example, a storage device configured to store data, instructions, and/or any other information.

Figure 2:
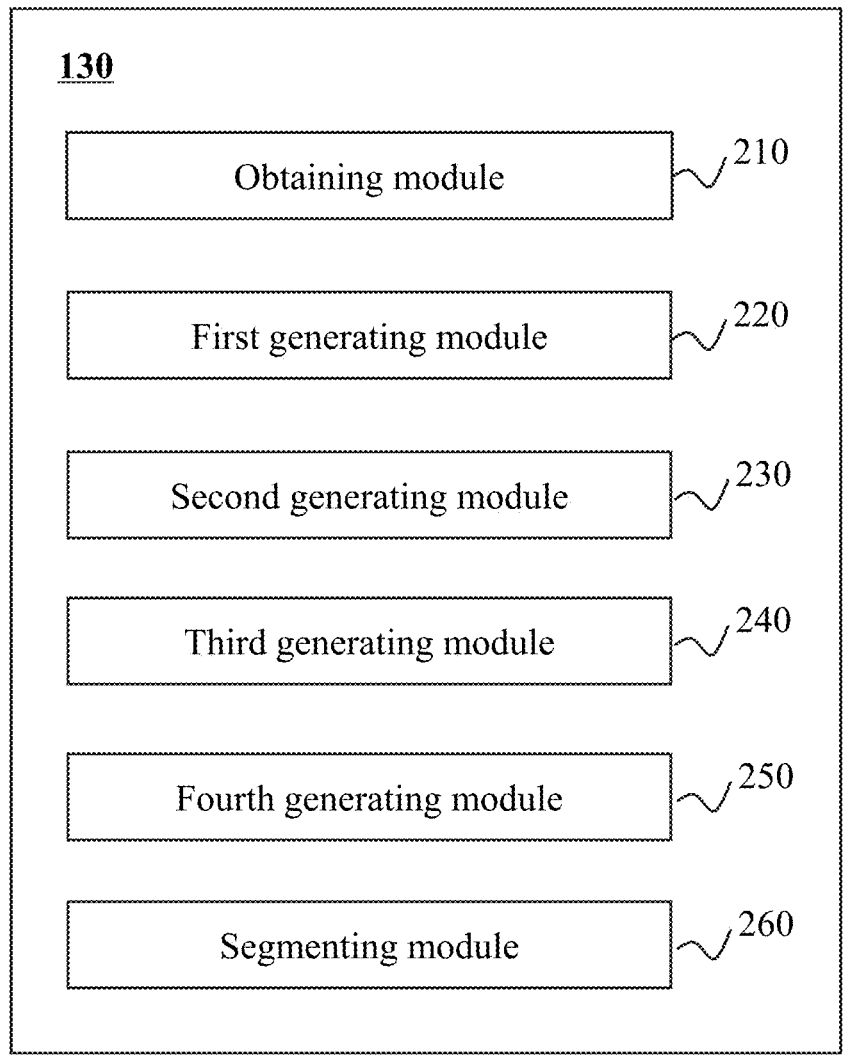
FIG. 2 is a block diagram illustrating an exemplary processing device according to some embodiments of the present disclosure.

FIG. 2 is a schematic block diagram illustrating an exemplary processing device according to some embodiments of the present disclosure. The processing device 130 may include an obtaining module 210, a first generating module 220, a second generating module 230, a third generating module 240, a fourth generating module 250, and a segmenting module 260.

The obtaining module 210 may be configured to obtain an initial vascular image. More descriptions of obtaining the initial vascular image may be found elsewhere in the present disclosure (e.g., operation 302 or the descriptions thereof).

The first generating module 220 may be configured to generate a vascular fragment image by performing a vascular fragmentation operation on the initial vascular image. More descriptions of generating the vascular fragment image by performing a vascular fragmentation operation on the initial vascular image may be found elsewhere in the present disclosure (e.g., operation 304 or the descriptions thereof).

The second generating module 230 may be configured to generate a vascular centerline image based on the vascular fragment image. More descriptions of generating the vascular centerline image based on the vascular fragment image may be found elsewhere in the present disclosure (e.g., operation 306 or descriptions thereof). In some embodiments, the second generating module 230 may be configured to generate a vascular centerline fragment image. More descriptions of generating the vascular centerline fragment image may be found elsewhere in the present disclosure (e.g., process 1300 or descriptions thereof).

The third generating module 240 may be configured to generate a 3D vascular wall image by processing the initial vascular image. More descriptions of generating the 3D vascular wall image may be found elsewhere in the present disclosure (e.g., FIG. 4 or descriptions thereof).

The third generating module 250 may be configured to generate a target vascular image by processing the initial vascular image. More descriptions of generating the target vascular image may be found elsewhere in the present disclosure (e.g., FIG. 14 or descriptions thereof). The segmenting module 260 may be configured to generate a segmentation image of a target tissue. More descriptions of generating the segmentation image may be found elsewhere in the present disclosure (e.g., FIG. 15 or descriptions thereof).

The modules in the processing device 130 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units.

In some embodiments, the processing device 130 may include one or more additional modules, and/or one or more modules described above may be omitted. For example, the processing device 130 may further include a training module configured to generate one or more machine learning models used for vascular image processing. In some embodiments, the training module and other modules described above may be implemented on different computing devices. Merely by way of example, the training module may be implemented on a computing device of a vendor of the machine learning model(s) used for vascular image processing, while the other modules described above may be implemented on a computing device of a user of the machine learning model(s).

Figure 3:
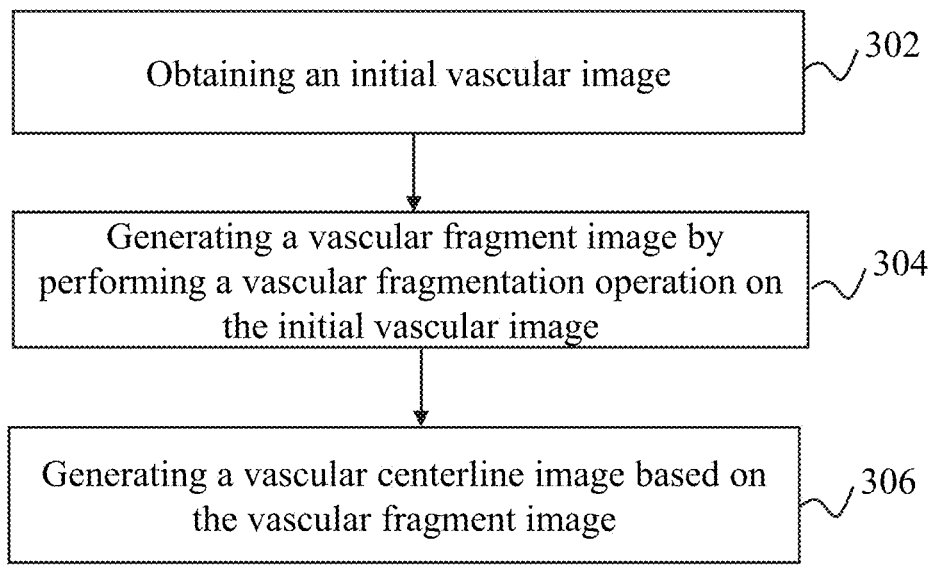
FIG. 3 is a flowchart illustrating an exemplary process for vascular image processing according to some embodiments of the present disclosure.

FIG. 3 is a flowchart illustrating an exemplary process for vascular image processing according to some embodiments of the present disclosure. In some embodiments, a process 300 may be executed by the image processing system 100. For example, the process 300 may be implemented as a set of instructions (e.g., an application) stored in a storage device. In some embodiments, the processing device 130 (e.g., one or more modules illustrated in FIG. 2) may execute the set of instructions and may accordingly be directed to perform the process 300. The process 300 may include following operations.

In 302, the processing device 130 may obtain an initial vascular image. In some embodiments, operation 302 may be performed by the obtaining module 210.

The initial vascular image may refer to a medical image obtained by an imaging device (e.g., the imaging device 120). For example, the initial vascular image may be an image including vascular information generated based on scan data collected by the imaging device in a scan of a target subject. The target subject may include a patient or other medical experimental subject (e.g., a mouse for a test, etc.). The target subject may also include a specific portion of a patient or other medical experimental subject. The specific portion may include organ and/or tissue. For example, the subject may include head, brain, neck, body, shoulder, arm, thorax, cardiac, stomach, blood vessel, soft tissue, knee, feet, or the like, or any combination thereof.

In some embodiments, the initial vascular image may be a two-dimensional (2D) image, a three-dimensional (3D) image, a four-dimensional (4D) image, etc. The initial vascular image may be an MRI image, a CT image, a DSA image, a PET image, etc. In some embodiments, the initial vascular image may be the MRI image. A magnetic resonance device may obtain different initial vascular images based on different scanning manners. For example, the initial vascular image may include a Time of Flight Magnetic Resonance Angiograms (TOF-MRA) image, a Contrast Enhanced Magnetic Resonance Angiography (CE-MRA) image, an image obtained by performing a subtraction operation on the CE-MRA image, a T1 enhanced image, a T1 image, a T2 image, a proton density image, etc.

In some embodiments, the initial vascular image may include a black blood image and/or a bright blood image. The black blood image and the bright blood image may be obtained based on magnetic resonance techniques. In the bright blood image, blood may be represented as high-level signals, and other tissues may be represented as low-level signals. In the black blood image, blood signals may be suppressed, and other tissues may be represented as high-level signals. More details about the black blood image and the bright blood image may be found elsewhere (e.g., FIG. 7 and related descriptions thereof).

In some embodiments, the processing device 130 may obtain the initial vascular image from a database, a storage device, or an imaging device (e.g., the imaging device 120).

In some embodiments, the processing device 130 may perform a gray-scale normalization operation on the initial vascular image. The gray-scale normalization operation may process one or more gray-scale values of the initial vascular image, so that the gray-scale value(s) may be within in a preset gray-scale range. The processing device 130 may obtain the preset gray-scale range and select a part of gray-scale region (i.e., a vascular region in the initial vascular image) from a gray-scale distribution range of the initial vascular image in an adaptive way, so that the gray-scale value(s) of the processed gray-scale region may be located in the preset gray-scale range. Merely by way of example, the processing device 130 may process 95% or more gray-scale region selected from the gray-scale distribution range of the initial vascular image, so that the selected gray-scale region may be mapped into a preset gray-scale region in a range of 0-200.

The gray-scale normalization operation may reduce differences between the gray-scale values of different initial vascular images, thereby improving an accuracy of a determination of a vascular centerline and methods for vascular image processing.

In 304, the processing device 130 (e.g., the first generating module 220) may generate a vascular fragment image by performing a vascular fragmentation operation on the initial vascular image.

The vascular fragment image may refer to an image in which blood vessels are represented in the form of vascular fragments. A vascular fragment may also be referred to as a vascular segment, which is a portion of a blood vessel. For example, the processing device 130 may divide a blood vessel (e.g., most of blood vessels in the initial vascular image may be connected with each other to form a single unit) in an image into a plurality of fragments in certain manners. Merely by way of example, the processing device 130 may perform a vascular fragmentation operation on a long blood vessel to generate a plurality of vascular fragments, each of which is independent from each other. In some embodiments, the vascular fragmentation operation may include operations such as segmenting a blood vessel, dividing the blood vessel into multiple vascular fragments (or segments), and labeling the vascular fragments.

In some embodiments, the vascular fragmentation operation may extract and divide a blood vessel in the initial vascular image in a certain way. For example, the processing device 130 may extract the blood vessel(s) from the initial vascular image and perform the vascular fragmentation operation on the extracted blood vessel(s) based on a position of the blood vessel(s), a type of the blood vessel(s), etc. For instance, the processing device 130 may recognize the blood vessel(s) in the initial vascular image based on a target recognition algorithm, and perform the vascular fragmentation operation on the blood vessel(s) based on tissue or organ the blood vessel(s) belong to. For example, a first part of a blood vessel may be located in the cardiac, a second part of the blood vessel may be located in the kidney, and a third part of the blood vessel may be located in the abdomen, so that the processing device 130 may perform the vascular fragmentation operation on the blood vessel based on the position of the blood vessel to generate the plurality of vascular fragments corresponding to the cardiac, the kidney, and the abdomen, respectively. Alternatively, the processing device 130 may also perform the vascular fragmentation operation based on the types of blood vessels such as an arterial blood vessel, a venous blood vessel, a capillary, etc.

In some embodiments, the vascular fragment image may include at least one vascular fragment. In some embodiments, different vascular fragments in the vascular fragment image may be marked in different manners. For example, different vascular fragments may be marked with lines of different thickness and/or colors, or different shapes (e.g., a rectangle, a circle). As another example, different vascular fragments may be marked with different identifiers, such as a text identifier, a number identifier, a symbol identifier, etc. It should be noted that different vascular fragments may be marked in different manners using a combination of various marking manners, which is not limited herein.

In some embodiments, the processing device 130 may generate the vascular fragment image by processing the initial vascular image based on a first vascular fragmentation model. For example, the processing device 130 may input the initial vascular image into the first vascular fragmentation model, and the first vascular fragmentation model may determine or output the vascular fragment image after processing the initial vascular image. In some embodiments, a vascular fragmentation model used herein may also referred to as a vascular fragment labeling model.

In some embodiments, the processing device 130 may generate a vascular segmentation image by segmenting blood vessels from the initial vascular image, and generate the vascular fragment image by processing the initial vascular image and the vascular segmentation image based on the first vascular fragmentation model. The vascular segmentation image may refer to an image corresponding to a vascular structure segmented from the initial vascular image. For example, the processing device 130 may segment the blood vessels from the initial vascular image based on an image segmentation algorithm (e.g., a threshold-based segmentation algorithm, a neural network-based segmentation algorithm, etc.) to generate the vascular segmentation image. The processing device 130 may input the initial vascular image and the vascular segmentation image into the first vascular fragmentation model, and the first vascular fragmentation model may generate the vascular fragment image after processing the initial vascular image and the vascular segmentation image. The first vascular fragmentation model may include two input channels configured to receive the initial vascular image and the vascular segmentation image, respectively. In some embodiments, the processing device 130 may merely input the vascular segmentation image into the first vascular fragmentation model, and the first vascular fragmentation model may generate the vascular fragment image based on the vascular segmentation image.

An input of the first vascular fragmentation model may be of various types. A user may select a type of input based on actual requirements, thereby improving an applicability of methods for vascular image processing. When the input of the first vascular fragmentation model is the initial vascular image and the vascular segmentation image, the input channel corresponding to the vascular segmentation image may be focus on vascular information while removing interference of relevant backgrounds, thereby improving an accuracy of the vascular fragment image and efficiency of the methods for vascular image processing.

Figure 16A:
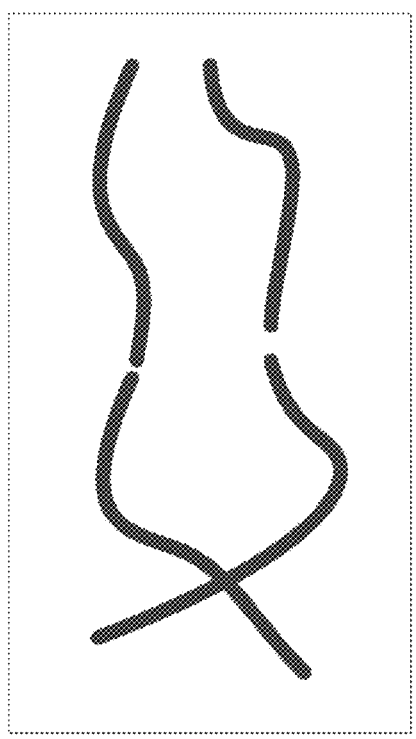
FIG. 16A is a schematic diagram illustrating an exemplary vascular fragment image according to some embodiments of the present disclosure.

In some embodiments, a count of the vascular fragments in the vascular fragment image may be equal to a count of the vascular fragments in the initial vascular image (e.g., the black blood image or the bright blood image), so that an optimal performance of vascular fragmentation may be achieved. For instance, an exemplary vascular fragment image generated by performing the vascular fragmentation operation on the black blood image is shown in FIG. 16A.

In some embodiments, the first vascular fragmentation model may be a trained machine learning model. For example, the first vascular fragmentation model may be a convolutional neural network model. In some embodiments, the processing device 130 (e.g., the training module) may determine the first vascular fragmentation model by training a preliminary vascular fragmentation model based on a plurality of training samples. For example, each training sample may include a sample initial vascular image and a label corresponding to the sample initial vascular image (i.e., a ground truth vascular fragment image). As another example, each training sample may include a sample initial vascular image, a sample vascular segmentation image, and a label (i.e., a ground truth vascular fragment image). The label may be determined by manual marking or manual confirmation. The processing device 130 may train the first vascular fragmentation model based on various common training manners, such as a gradient descent algorithm or the like.

In some embodiments, the initial vascular image may include a black blood image and a bright blood image. The processing device 130 may perform the vascular fragmentation operation on the black blood image to generate a first vascular fragment image. The processing device 130 may perform the vascular fragmentation operation on the bright blood image to generate a second vascular fragment image. In some embodiments, when the initial vascular image includes the black blood image and the bright blood image, the processing device 130 may generate a fused vascular fragment image by processing the black blood image and the bright blood image based on a second vascular fragmentation model. The fused vascular fragment image may refer to a vascular fragment image that combines vascular information in the black blood image and the bright blood image. For example, the processing device 130 may input the black blood image and the bright blood image into the second vascular fragmentation model, and the second vascular fragmentation model may determine or output the fused vascular fragment image.

The second vascular fragmentation model may be trained in a similar training manner to the first vascular fragmentation model but with different training data. For example, each training sample of the second vascular fragmentation model may include a sample black blood image and a sample bright blood image, and a label may be a ground truth fused vascular fragment image of the sample black blood image and the sample bright blood image. The label may be determined by manual marking or other feasible manners.

More details about determining a vascular fragment image may be found elsewhere in the present disclosure (e.g., FIG. 7 and related descriptions thereof), which is not repeated herein. In 306, the processing device 130 may generate a vascular centerline image based on the vascular fragment image. In some embodiments, operation 306 may be performed by the second generating module 230.

A vascular centerline may refer to a line representing a center position of a blood vessel. In some embodiments, the vascular centerline may be a line determined by connecting a center point of each of a plurality of vascular fragments of the blood vessel. The vascular centerline image may be an image including one or more vascular centerlines.

Figure 16B:
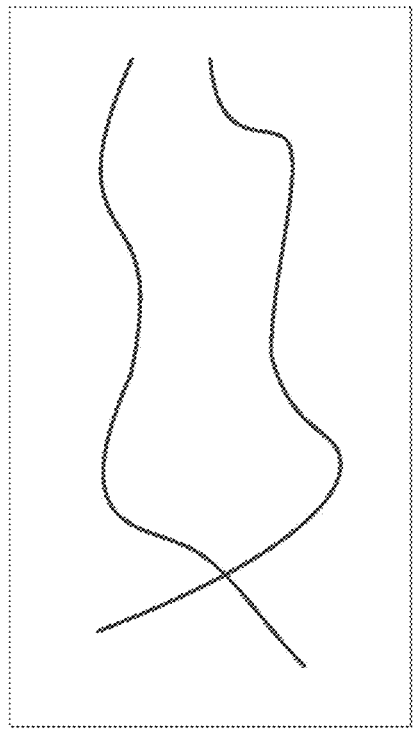
FIG. 16B is a schematic diagram illustrating an exemplary vascular centerline image according to some embodiments of the present disclosure.

In some embodiments, the processing device 130 may generate the vascular centerline image based on a vascular centerline of each of one or more vascular fragments in the vascular fragment image. For example, the processing device 130 may extract a plurality of fragment centerlines corresponding to a plurality of vascular fragments in the vascular fragment image, and generate the vascular centerline image based on the plurality of fragment centerlines. For instance, an exemplary vascular centerline image is shown in FIG. 16B. In some embodiments, the processing device 130 may extract a centerline of each vascular fragment in the vascular fragment image based on a centerline extraction algorithm. The centerline extraction algorithm may include an online learning algorithm, a model-based centerline extraction algorithm, a non-model-based centerline extraction algorithm, etc., which is not limited herein. More details about generating a vascular centerline image may be found elsewhere in the present disclosure (e.g., FIG. 11 and related descriptions).

In some embodiments, the processing device 130 may perform the vascular fragmentation operation on the initial vascular image to generate the vascular fragment image, and obtain the vascular centerline(s) based on the vascular fragment image, thereby improving an accuracy and efficiency of extracting the vascular centerline(s), and reducing manual intervention compared with conventional approaches that extracts the vascular centreline(s) manually or a directly extract the vascular centerline(s) from the initial vascular image to generate the vascular centreline image. The vascular centerline image may facilitate a detection and localization of a lesion.

In some embodiments, the initial vascular image may be the black blood image. The processing device 130 may input the black blood image into a preset fragmentation model of a black blood vessel to generate a vascular fragment image including at least one vascular fragment. The processing device 130 may extract a fragment centerline of each vascular fragment in the vascular fragment image to generate a vascular centerline image corresponding to the black blood image. The vascular centerline(s) may be obtained directly from the black blood image without a need for acquiring the bright blood image corresponding to the black blood image, thus eliminating the need of considering a quality of the bright blood image and performing image alignment between the bright blood image and the black blood image, which is simple, time-saving, and efficient.

In some embodiments, operation 300 may also include one or more additional steps. For example, the processing device 130 may generate a 3D vascular wall image based on the vascular centerline image. More details about the 3D vascular wall image may be found elsewhere in the present disclosure (e.g., FIG. 4 and related descriptions thereof). As another example, the processing device 130 may determine whether there is a target tissue (e.g., a vascular wall, a plaque, a disease tissue, etc.) in a blood vessel included in the initial vascular image, and generate a segmentation image of the target tissue by segmenting the target tissue, thereby assisting a physician in a diagnosis of a patient's condition.

Figure 4:
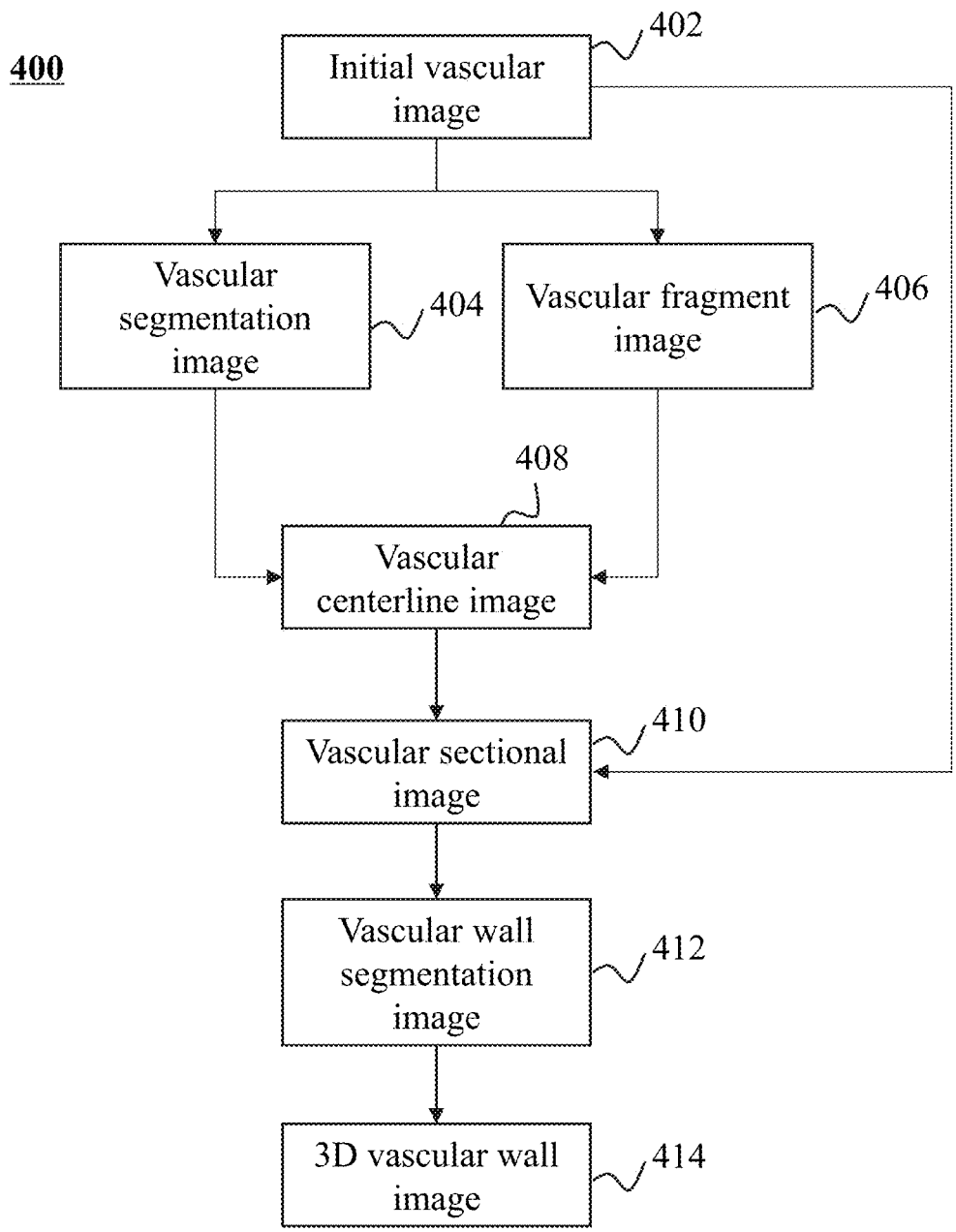
FIG. 4 is a flowchart illustrating an exemplary process for generating a 3D vascular wall image according to some embodiments of the present disclosure.

FIG. 4 is a schematic diagram illustrating an exemplary process for generating a 3D vascular wall image according to some embodiments of the present disclosure. In some embodiments, a process 400 may be an embodiment of the process 300 as described in connection with FIG. 3. In some embodiments, the process 400 may be performed by the third generating module 240 of the processing device 130.

In 402, the processing device 130 may obtain an initial vascular image.

Operation 402 may be performed in a similar manner as operation 302, and the descriptions thereof are not repeated here.

After the initial vascular image is obtained, the processing device 130 may generate the vascular centerline image by processing the initial vascular image. In some embodiments, the vascular centerline image may be generated by performing operations 404 and 408, or the vascular centerline image may be generated by performing operations 406 and 408.

In 404, the processing device 130 may perform a vascular segmentation operation on the initial vascular image to obtain a vascular segmentation image.

Figure 6A:
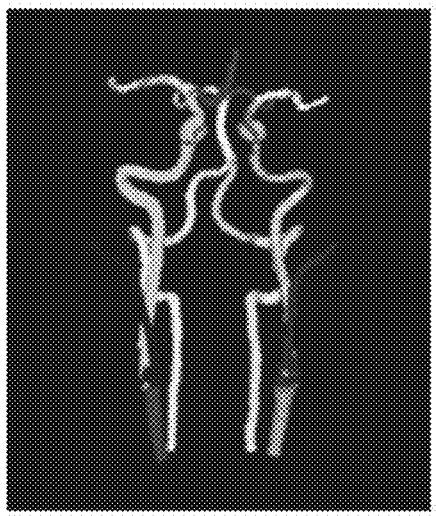
FIG. 6A is a schematic diagram illustrating an exemplary vascular segmentation image according to some embodiments of the present disclosure.

The vascular segmentation image may refer to an image obtained by performing the vascular segmentation operation on the initial vascular image. For example, the vascular segmentation image may include blood vessel(s) segmented from the initial vascular image but not include other tissues. For instance, an exemplary vascular segmentation image obtained by performing the vascular segmentation operation on the initial vascular image is shown in FIG. 6A. In some embodiments, the vascular segmentation operation may be performed based on a segmentation algorithm, a segmentation model, etc., which is not limited herein. For example, the processing device 130 may input the initial vascular image into a trained vascular segmentation model, and the vascular segmentation model may determine or output the vascular segmentation image. The vascular segmentation model may be obtained by training a neural network based on a sample initial vascular image and a corresponding ground truth vascular segmentation image, and the type of the sample initial vascular image may be the same as the type of the initial vascular image.

In 406, the processing device 130 may generate a vascular fragment image by performing a vascular fragmentation operation on the initial vascular image.

Operation 406 may be performed in a similar manner as operation 304, and the descriptions thereof are not repeated here.

In 408, the processing device 130 may generate a vascular centerline image based on the vascular segmentation image or the vascular fragment image.

Figure 6B:
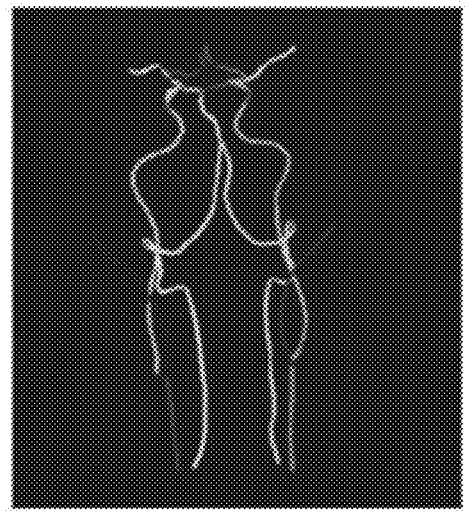
FIG. 6B is a schematic diagram illustrating an exemplary vascular centerline image according to some embodiments of the present disclosure.

In some embodiments, the processing device 130 may extract the vascular centerline(s) based on the vascular segmentation image or the vascular fragment image and generate the vascular centerline image based on the extracted vascular centerline(s). For example, the processing device 130 may perform a skeletonization operation (i.e., removing boundaries of a blood vessel in an image based on a morphological erosion operation) on the vascular segmentation image or the vascular fragment image to generate the vascular centerline image. As another example, the processing device 130 may generate the vascular centerline image by processing the vascular segmentation image or the vascular fragment image based on at least one of a distance transformation algorithm, a route planning algorithm (e.g., an optimal route algorithm), and a tracing algorithm. Merely by way of example, a vascular centerline image shown in FIG. 6B may be generated by performing the skeletonization operation on a vascular segmentation image shown in FIG. 6A.

In 410, the processing device 130 may determine a plurality of vascular sectional images corresponding to a plurality of vascular sections based on the vascular centerline image and the initial vascular image.

A vascular sectional image may refer to a cross sectional image perpendicular to the vascular centerline. A vascular wall, a vascular lumen, etc., may be viewed based on the vascular sectional image.

In some embodiments, the processing device 130 may determine the plurality of vascular sectional images corresponding to the plurality of vascular sections by performing an image reconstruction operation on the vascular centerline image and the initial vascular image. For example, the processing device 130 may determine a position of a vascular section based on the vascular centerline image and perform the image reconstruction operation on the vascular sectional image at the position thereof.

In some embodiments, the processing device 130 may determine a plurality of sectional points on at least one vascular centerline in the initial vascular image based on the vascular centerline image. For each of the plurality of sectional points, the processing device 130 may also determine one or more neighbor pixels of the sectional point in the initial vascular image, and generate the vascular sectional image corresponding to the vascular section where the sectional point is located based on the one or more neighbor pixels of the sectional point.

For example, the processing device 130 may randomly select a plurality of points on a vascular centerline and determine the plurality of points as the sectional points. A distance between adjacent sectional points may be the same or different. For each of the plurality of sectional points on the vascular centerline, the processing device 130 may determine a pixel adjacent to the sectional point along a direction perpendicular to the vascular centerline in the initial vascular image, that is, a neighbor pixel of the sectional point. In some embodiments, one or more neighbor pixels of the sectional point may be determined. In some embodiments, the processing device 130 may select a plurality of neighbor pixels of the sectional point along the direction perpendicular to the vascular centerline in the initial vascular image and determine the plurality of neighbor pixels as first neighbor pixels. For each of the first neighbor pixels, the processing device 130 may further select a plurality of neighbor pixels of the first neighbor pixel along the direction perpendicular to the vascular centerline in the initial vascular image and determine the plurality of neighbor pixels thereof as second neighbor pixels. The first neighbor pixels and the second neighbor pixels may be designated as the neighbor pixels of the sectional point.

For each of the plurality of sectional points, the processing device 130 may perform a pixel interpolation operation on the neighbor pixels of the sectional point along the direction perpendicular to the vascular centerline to determine a vascular sectional image corresponding to the sectional point.

In some embodiments, the vascular sectional images may be sectional images of a 3D initial vascular image. The vascular sectional images of the initial vascular image may be stored in a storage device. The processing device 130 may obtain the vascular sectional images directly from the storage device. It should be noted that the count of the vascular sectional images and an acquisition manner of the vascular sectional images are not limited in the present disclosure.

The reconstruction method of the plurality of vascular sectional images based on the vascular centerline image corresponding to the initial vascular image is simple to understand and easy to implement. When the resolution of the initial vascular image does not satisfy actual requirements, the resolution of the vascular sectional images may be adjusted based on an interpolation operation or the like to satisfy the actual requirements.

In 412, for each of the plurality of vascular sections, the processing device 130 may generate a vascular wall segmentation image by processing the vascular sectional image of the vascular section based on a vascular wall segmentation model.

The vascular wall segmentation image may refer to an image obtained by segmenting the vascular wall from the vascular sectional image, which may also be referred to as a labelled vascular wall image.

In some embodiments, for each of the plurality of vascular sections, the processing device 130 may input the vascular sectional image corresponding to the vascular section into the vascular wall segmentation model, and the vascular wall segmentation model may determine or output the vascular wall segmentation image corresponding to the vascular section. The processing device 130 may input the plurality of vascular sectional images into the vascular wall segmentation model at once, or the processing device 130 may input one vascular sectional image into the vascular wall segmentation model each time. In some embodiments, the vascular wall segmentation model may segment a plaque from a vascular sectional image input into the vascular wall segmentation model. That is, the vascular wall segmentation image may also include a segmentation result of plaques (i.e., a plaque marker).

In some embodiments, the vascular wall segmentation model may be a convolutional neural network model. The vascular wall segmentation model may be trained based on a sample vascular sectional image and a corresponding ground truth vascular wall segmentation image. The ground truth vascular wall segmentation image may include a ground truth vascular wall marker. In some embodiments, the ground truth vascular wall segmentation image may also include a ground truth plaque marker.

In some embodiments, after the vascular wall segmentation image is generated, the processing device 130 may determine whether a vascular structure in the vascular sectional image satisfies a preset condition. In response to determining that the vascular structure does not satisfy the preset condition, the processing device 130 may remove the vascular sectional image or adjust the vascular sectional image. The vascular structure may refer to a tissue structure relating to a blood vessel. For example, the vascular structure may include the vascular wall, the vascular lumen, etc. The preset condition may include that a vascular lumen contour does not exceed a vascular wall contour, a size of the vascular lumen is within in a first preset range, a size of the vascular wall is within in a second preset range, a distance between the vascular lumen and the vascular wall is within in a third preset range, or the like.

In some embodiments, the processing device 130 may perform the interpolation operation on a missing vascular structure (e.g., a missing contour, etc.) based on the vascular wall segmentation image to fill a blood vessel located between contours, remove non-vascular point(s), or the like.

In 414, the processing device 130 may generate a 3D vascular wall image based on the vascular wall segmentation image corresponding to each of the plurality of vascular sections.

The 3D vascular wall image may refer to a 3D image representing the vascular wall. When the vascular wall segmentation image includes the plaque marker, the 3D vascular wall segmentation may also display a plaque. In some embodiments, the processing device 130 may generate the 3D vascular wall image by performing the image reconstruction operation on the vascular wall segmentation image corresponding to the each of the plurality of vascular sections.

In some embodiments, for the each of the plurality of vascular sections, the processing device 130 may reconstruct a two-dimensional (2D) vascular wall image corresponding to the vascular section based on the vascular wall segmentation image of the vascular section. For each of a plurality of pairs of adjacent vascular sections of the plurality of vascular sections, the processing device 130 may generate an initial 3D vascular wall image based on the 2D vascular wall images corresponding to the pair of adjacent vascular sections. The processing device 130 may then generate the 3D vascular wall image based on the initial 3D vascular wall images of the plurality of pairs of the adjacent vascular sections.

Figure 5A:
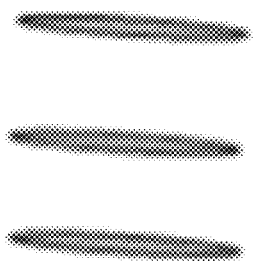
FIGS. 5A-5C are schematic diagrams illustrating an exemplary process for generating 3D vascular wall images according to some embodiments of the present disclosure.
Figure 5B:
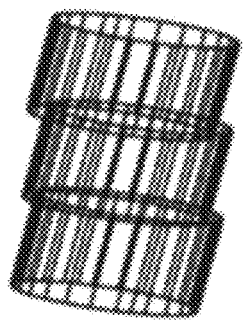
Figure 5C:
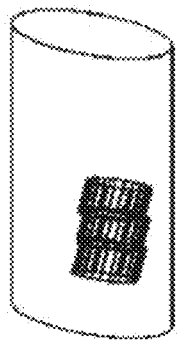

The reconstruction of a 2D vascular wall image may also refer to an intra-layer reconstruction. In some embodiments, after the 2D vascular wall images are generated based on the image reconstruction, the processing device 130 may perform an inter-layer interpolation reconstruction operation on each pair of reconstructed 2D vascular wall images corresponding to adjacent vascular sections to generate the initial 3D vascular wall images. The processing device 130 may then generate the 3D vascular wall image based on the initial 3D vascular wall images. Merely by way of example, FIG. 5A shows a plurality of 2D vascular wall images, FIG. 5B shows initial 3D vascular wall images generated based on the inter-layer interpolation reconstruction operation, and FIG. 5C shows a 3D vascular wall image.

In some embodiments, the 3D vascular wall image may include different types of vascular fragments. When the processing device 130 determines the vascular centerline(s) by performing the skeletonization operation on the vascular fragment image, the vascular centerline(s) include different types of vascular fragments, so that the 3D vascular wall image generated based on the vascular sectional images corresponding to the vascular centerline(s) may also include different types of vascular fragments. In this way, a user may obtain a 3D vascular wall image corresponding to a target type of a blood vessel based on the different types of vascular fragments in the 3D vascular wall image. The target type of the blood vessel may be a type of a blood vessel or a combination of multiple types of blood vessels. For example, 3D vascular wall images corresponding to all types of blood vessels may be displayed on a display, or 3D vascular wall image(s) corresponding to a specific type of a blood vessel or multiple specific types of blood vessels may be displayed based on actual requirements.

In some embodiments, the 3D vascular wall image may include information about the vascular wall. The information about the vascular wall may include a size of the vascular wall, a stenosis rate of the vascular wall, a grayscale value of the vascular wall, etc. When the 3D vascular wall image includes the plaque, the 3D vascular wall image may also include information about the plaque. The information about the plaque may include a size of the plaque, a vulnerability rate of the plaque, etc. It should be noted that the information about the vascular wall and the information about the plaque are not limited herein.

In some embodiments, the processing device 130 may determine a plurality of vascular sectional images of an initial vascular image, input the plurality of vascular sectional images into the vascular wall segmentation model, and generate a plurality of vascular wall segmentation images corresponding to the plurality of vascular sectional images. The processing device 130 may also perform the image reconstruction operation on the plurality of vascular wall segmentation images based on a vascular wall marker and a plaque marker in each of the plurality of vascular wall segmentation images to generate a 3D vascular wall image. The plaque may be located in the vascular wall in the 3D vascular wall image. Compared with conventional techniques that determine information about the plaque by analyzing a vascular lumen image, the 3D vascular wall image may display the plaque in a more intuitive and comprehensive manner, and the information about the plaque may be determined more accurately by analysis of the plaque. In addition, compared with the vascular lumen image, the vascular wall image may display the information about the plaque in a more intuitive and comprehensive manner. By performing the vascular fragmentation operation during a process of generating the vascular centerline image, a diseased vascular fragment may be displayed in a specific manner or some specific diseased vascular fragments may be displayed jointly, which is convenient for a physician to view and saves time in operation.

Figure 7:
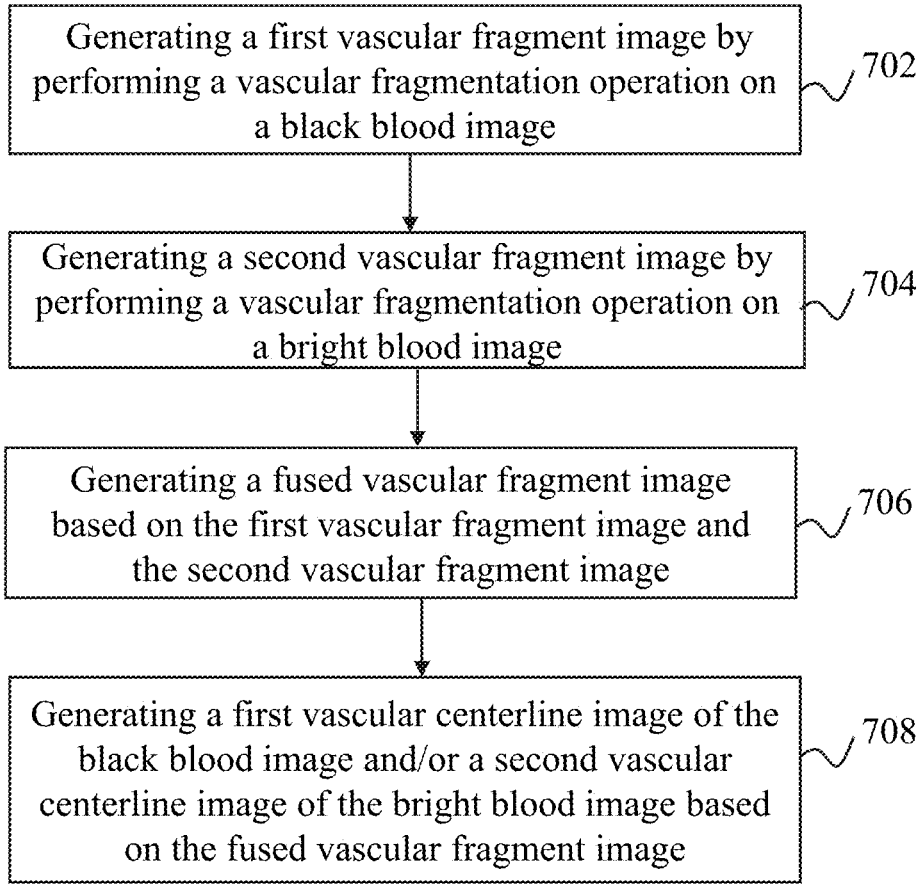
FIG. 7 is a flowchart illustrating an exemplary process for generating a vascular centerline image according to some embodiments of the present disclosure.

FIG. 7 is a flowchart illustrating an exemplary process for generating a vascular centerline image according to some embodiments of the present disclosure. In some embodiments, the process 700 may be performed by the second generating module 230 of the processing device 130.

In some embodiments, when the initial vascular image includes a black blood image and a bright blood image, the processing device 130 may perform the vascular fragmentation operation on the black blood image and the bright blood image, respectively. The processing device 130 may also perform an infusion operation on a vascular fragment image corresponding to the black blood image and a vascular fragment image corresponding to the bright blood image to generate a vascular centerline image corresponding to the black blood image and/or a vascular centerline image corresponding to the bright blood image.

The black blood image may refer to an image obtained by an medical scanning device (e.g., an MRI device) using a black blood technology. The black blood technology may involve applying a saturating RF pulse to pre-saturate the blood flow before the blood flow enters an imaging volume during angiography, and applying an RF pulse while the blood flow is entering the imaging volume. Since a longitudinal magnetization vector of the pre-saturated blood flow is small, which hardly produces a magnetic resonance signal, the blood flow may be represented as black low-level signals while the surrounding tissues may be represented as high-level signals, thereby forming the black blood image.

The bright blood image may refer to an image obtained by an medical scanning device (e.g., an MRI device) using a bright blood technology. The bright blood technology may involve acquisition based on a fast phase winding GRE T1W1 sequence with a short TR. Tissues in a resting state within the imaging volume or an imaging layer may be in a saturated state by repeated excitation and the magnetization vector may be small, thus suppressing background tissues in a resting state. However, the blood outside the imaging may not be in the saturated state due to the RF pulse. The blood that flows into the imaging volume or the imaging layer is represented as high-level signals, and a good contrast may be formed between the tissues in the resting state, thereby forming a bright blood image.

For instance, an exemplary black blood image of a cerebrovascular is shown in FIG. 8A, and an exemplary bright blood image of a cerebrovascular is shown in FIG. 8B.

For instance, the processing device 130 may perform the following operations to generate a first vascular centerline image corresponding to the black blood image and/or a second vascular centerline image corresponding to the bright blood image.

In 702, the processing device 130 may generate a first vascular fragment image by performing the vascular fragmentation operation on the black blood image.

The first vascular fragment image may refer to a vascular fragment image corresponding to the black blood image. In some embodiments, the vascular fragmentation image may be performed on the black blood image in a similar manner to the vascular fragmentation operation performed on the initial vascular image as described in connection with operation 304. In some embodiments, the processing device 130 may input the black blood image into a black blood vascular fragmentation model for performing the vascular fragmentation operation to generate the first vascular fragment image.

In some embodiments, the processing device 130 may mark different types of vascular regions in the first vascular fragment image through a preset manner, and generate the first vascular fragment image with vascular marker(s). The first vascular fragment image may include one or more types of vascular fragments. For example, different types of vascular fragments may be marked with different colors in the first vascular fragment image, and each color may represent one type of vascular fragment.

In 704, the processing device 130 may generate a second vascular fragment image by performing the vascular fragmentation operation on the bright blood image.

The second vascular fragment image may refer to a vascular fragment image corresponding to the bright blood image. In some embodiments, the vascular fragmentation image may be performed on the bright blood image in a similar manner to the vascular fragmentation operation performed on the initial vascular image as described in connection with operation 304. In some embodiments, the processing device 130 may input the bright blood image into a bright blood vascular fragmentation model for performing the vascular fragmentation operation to generate the second vascular fragment image.

In some embodiments, the processing device 130 may mark different types of vascular regions in the second vascular fragment image through a preset manner, and generate the second vascular fragment image with vascular marker(s). The second vascular fragment image may include one or more types of vascular fragments. For example, different types of vascular fragments may be marked with different colors in the second vascular fragment image, and each color may represent one type of vascular fragment.

The black blood vascular fragmentation model and the bright blood vascular fragmentation model may be of a same type of model, such as a convolutional neural network. The training data of the two models may be different, and the training manners of the two models thereof may be the same or different. The black blood vascular fragmentation model may be trained based on a sample black blood image and a ground truth vascular fragment image corresponding to the sample black blood image. The bright blood vascular fragmentation model may be trained based on a sample bright blood image and aground truth vascular fragment image corresponding to the sample bright blood image. In some embodiments, the black blood vascular fragmentation model and the bright blood vascular fragmentation model may be exemplary embodiments of the first vascular fragmentation model shown in FIG. 3.

In 706, the processing device 130 may generate a fused vascular fragment image based on the first vascular fragment image and the second vascular fragment image.

The fused vascular fragment image may refer to an image generated by performing image registration operation and infusion operation on the first vascular fragment image and the second vascular fragment image. For example, the processing device 130 may align the first vascular fragment image and the second vascular fragment image via rigid registration operation, and superimpose the aligned first vascular fragment image and the aligned second vascular fragment image. In some embodiments, one of the aligned first vascular fragment image and the aligned second vascular fragment image may be determined as a reference image. When positions of the same vascular fragment in two images are different, the two images may be aligned based on the position of the vascular fragment in the reference image. For instance, an exemplary first vascular fragment image is shown in FIG. 9A, an exemplary second vascular fragment image is shown in FIG. 9B, and an exemplary fused vascular fragment image is shown in FIG. 9C.

In some embodiments, the processing device 130 may also perform noise reduction operation on the first vascular fragment image and the second vascular fragment image before performing the image registration operation and the fusion operation. The noise reduction operation may refer to removing information other than blood vessels from a vascular fragment image, such as other body tissues of the subject, a noisy region, etc.

In some embodiments, the processing device 130 may obtain reference information relating to vascular architecture. The processing device 130 may also perform correction operation on the first vascular fragment image and the second vascular fragment image based on the reference information. The processing device 130 may further generate the fused vascular fragment image based on a corrected first vascular fragment image and a corrected second vascular fragment image.

The reference information relating to the vascular architecture may include position information of a vascular region, shape information of the vascular region, size information of the vascular region, etc. The correction operation may involve removing regions (i.e., interference regions) excluding the vascular architecture, adjusting a diameter of a vascular fragment, adjusting a direction of a vascular fragment, or the like, which is not limited herein. In some embodiments, the processing device 130 may remove the interference regions from the first vascular fragment image based on the reference information relating to vascular architecture and the vascular architecture in the first vascular fragment image. The processing device 130 may remove the interference regions from the second vascular fragment image based on the reference information relating to vascular architecture and the vascular architecture in the second vascular fragment image.

In some embodiments, By performing the correction operation, the corrected first vascular fragment image and the corrected second vascular image may include as little other information as possible, thereby improving an accuracy of the subsequent image registration operation and the fusion operation.

In 708, the processing device 130 may generate a first vascular centerline image of the black blood image and/or a second vascular centerline image of the bright blood image based on the fused vascular fragment image.

Each vascular fragment in the fused vascular fragment image may refer to each vascular region in the fused vascular fragment image. The processing device 130 may extract a fragment centerline of each vascular fragment in the fused vascular fragment image, that is, a centerline of each vascular region. More details about extracting a fragment centerline may be found elsewhere in the present disclosure (e.g., operation 408), which is not repeated herein.

The processing device 130 may determine a fragment centerline of a vascular fragment in the black blood image based on the fragment centerline of the each vascular fragment in the fused vascular fragment image, and generate the first vascular centerline image of the black blood image based on the fragment centerline(s) of the black blood image. For example, the processing device 130 may perform operation 1104 or process 1200 to generate the first vascular centerline image of the black blood image based on the fragment centerline(s) of the black blood image. Additionally or alternatively, the processing device 130 may determine a fragment centerline of a vascular fragment in the bright blood image based on a fragment centerline of each vascular fragment in the fused vascular fragment image, and generate the second vascular centerline image of the bright blood image based on the fragment centerline(s) of the bright blood image. For example, the processing device 130 may perform operation 1104 or process 1200 to generate the vascular centerline image of the bright blood image based on the fragment centerline(s) of the bright blood image.

Since the first vascular fragment image and the second vascular fragment image include a plurality of vascular fragments (i.e., a plurality of types of vascular regions), respectively, the fused vascular fragment image may also include a plurality of markers corresponding to a plurality of vascular fragments. The first vascular centerline image and/or the second vascular centerline image may also include a plurality of markers corresponding to a plurality of types of fragment centerlines, respectively.

In some embodiments, the processing device 130 may generate the fused vascular fragment image based on the black blood image and the bright blood image, and determine the fragment centerline of each vascular fragment in the black blood image or the bright blood image based on the fragment centerline of the each vascular fragment in the fused vascular fragment image. The fused vascular fragment image may include vascular information about the black blood image and the bright blood image, thereby improving an accuracy of the generated first vascular centerline image and second vascular centerline image.

In the process 700, the processing device 130 may perform the vascular fragmentation operation on the black blood image and the bright blood image, respectively, to generate the first vascular fragment image and the second vascular fragment image, and further generate the fused vascular fragment image. In some embodiments, the processing device 130 may also perform the vascular fragmentation operation (e.g., the second vascular fragmentation model) on the black blood image and the bright blood image at the same time to generate the fused vascular fragment image directly, which is described in related descriptions of FIG. 3 and may not be repeated herein.

Figure 11:
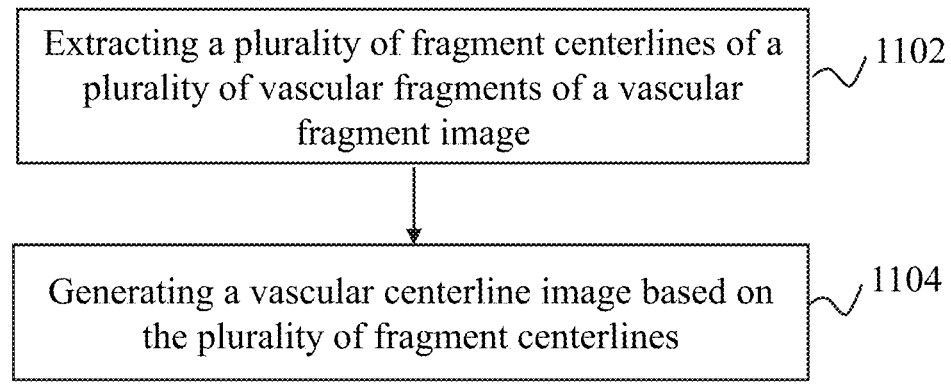
FIG. 11 is a flowchart illustrating an exemplary process for generating a vascular centerline image according to some embodiments of the present disclosure.

FIG. 11 is a flowchart illustrating an exemplary process for generating a vascular centerline image according to some embodiments of the present disclosure. In some embodiments, one or more operations of the process 1100 may be performed to achieve at least part of operation 306 as described in connection with FIG. 3. In some embodiments, the process 1100 may be performed by the second generating module 230 of the processing device 130.

In 1102, the processing device 130 may extract a plurality of fragment centerlines of a plurality of vascular fragments of a vascular fragment image.

Each of the plurality of fragment centerlines may correspond to one of the plurality of vascular fragments. The processing device 130 may extract a fragment centerline from a corresponding vascular fragment. In some embodiments, the vascular fragment image described in operation 1102 may refer to the vascular fragment image generated in operation 304 or 406. In some embodiments, the vascular fragment image described in operation 1102 may refer to one of the first vascular fragment image, the second vascular fragment image, and the fused vascular fragment image generated in process 700.

The processing device 130 may extract the plurality of fragment centerlines of the plurality of vascular fragments through various manners. For example, the processing device 130 may extract a fragment centerline corresponding to each vascular fragment in the vascular fragment image based on the skeletonization operation. The skeletonizing operation may remove the boundaries of blood vessels based on the morphological erosion operation to obtain the vascular centerline(s). As another example, the processing device 130 may extract a fragment centerline corresponding to each vascular fragment in the vascular fragment image based on an optimal route algorithm.

In some embodiments, for each vascular fragment, the processing device 130 may determine a first end point and a second end point of the vascular fragment (e.g., each of the plurality of vascular fragments in the first vascular fragment image). The first end point of the vascular fragment may refer to a center point of a head-end of the vascular fragment, and the second end point may refer to a center point of a tail-end of the vascular fragment. The processing device 130 may connect the first end point and the second end point of the vascular fragment based on the vascular fragment image to generate the fragment centerline of the vascular fragment. For example, the processing device 130 may determine a plurality of points on a centerline of the vascular fragment in the vascular fragment image based on a vascular refinement algorithm, and generate the fragment centerline of the vascular fragment by connecting the plurality of points, the first end point, and the second end point of the vascular fragment. As another example, the processing device 130 may generate the fragment centerline of the vascular fragment by connecting the first end point and the second end point based on the optimal route algorithm.

In some embodiments, due to objective factors, different vascular fragments in the initial vascular image may be obscured and poorly visualized, causing possible breakage of a vascular fragment in the vascular fragment image. That is, a vascular fragment may include a plurality of vascular sub-fragments (e.g., the first vascular fragment image may include a plurality of vascular fragments with a same color, and the plurality of vascular fragments with a same color may be part of blood vessels of a same tissue or organ). The processing device 130 may determine a centerline of each of the plurality of vascular sub-fragments corresponding to the vascular fragment, and generate the fragment centerline of the vascular fragment by connecting the centerline of each vascular sub-fragment. For example, for each vascular sub-fragment, the processing device 130 may determine a first endpoint and a second end point of the vascular sub-fragment, and determine a centerline of the vascular sub-fragment by connecting the first endpoint and the second endpoint of the vascular sub-fragment based on the vascular fragment image. Additionally or alternatively, after determining the centerline of each vascular sub-fragment of the vascular fragment, the processing device 130 may determine a connection order of the centerlines of the vascular sub-fragments based on the initial vascular image, and determine the fragment centerline of the vascular fragment by connecting centerlines of adjacent vascular sub-fragments based on the connection order. Additionally or alternatively, the processing device 130 may determine a missing part between the centerlines of adjacent vascular sub-fragments based on the initial vascular image and the optimal route algorithm. It should be noted that the processing device 130 may also connect the centerlines of adjacent vascular sub-fragments based on other connecting manners or connecting algorithms, which is not limited herein.

According to some embodiments of the present disclosure, the processing device 130 may determine a centerline of each vascular sub-fragment of a vascular fragment, and determine a fragment centerline of the vascular fragment by connecting the centerlines of the vascular sub-fragments, thereby obtaining an accurate and complete fragment centerline of the vascular fragment, which improves the accuracy and the completeness of centerline extraction.

Figures 17A, 17B, 17C:
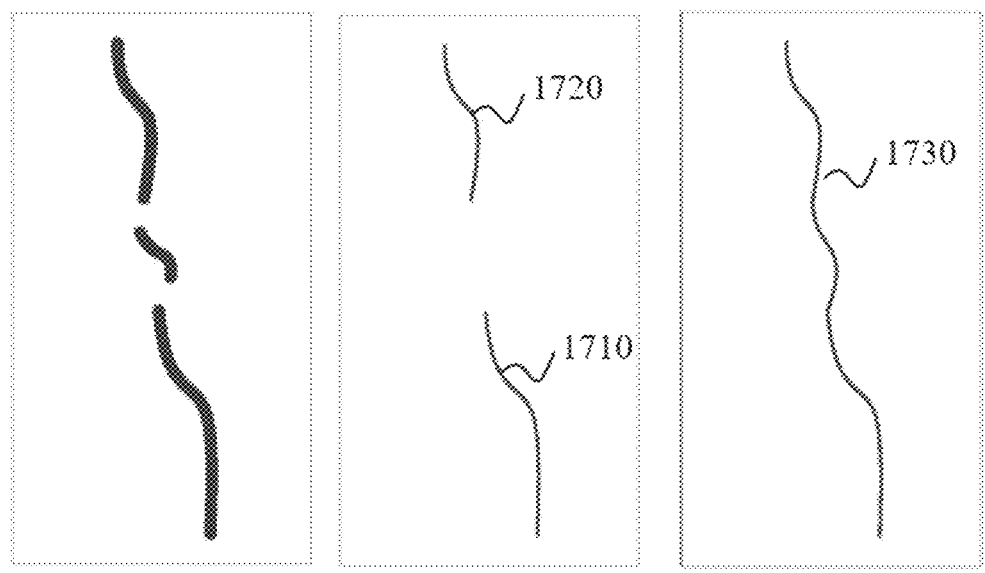
FIGS. 17A to 17C are schematic diagrams illustrating an exemplary process for determining a fragment centerline according to some embodiments of the present disclosure.

In some embodiments, when a vascular fragment includes a plurality of vascular sub-fragments, the processing device 130 may select two longest vascular sub-fragments from the vascular sub-fragments, and determine a fragment centerline of the vascular fragment based on the two longest vascular sub-fragments. For example, for a vascular fragment (e.g., a vascular fragment shown in FIG. 17(A)), the processing device 130 may determine a longest vascular sub-fragment and a second-longest vascular sub-fragment in a plurality of vascular sub-fragment of the vascular fragment. The processing device 130 may also determine a first endpoint and a second endpoint of the longest vascular sub-fragment. The processing device 130 may further determine a first endpoint and a second endpoint of the second-longest vascular sub-fragment. The processing device 130 may determine a first centerline (e.g., a centerline 1710 shown in FIG. 17(B) of the longest vascular sub-fragment by connecting the first endpoint and the second endpoint of the longest vascular sub-fragment. The processing device 130 may also determine a second centerline (e.g., a centerline 1720 shown in FIG. 17(B) of the second-longest vascular sub-fragment by connecting the first endpoint and the second endpoint of the second-longest vascular sub-fragment. The processing device 130 may determine the fragment centerline (e.g., a fragment centerline 1730 shown in FIG. 17(C) of the vascular fragment by connecting the first centerline and the second centerline.

In some embodiments, the processing device 130 may determine the first centerline of the longest vascular sub-fragment by connecting the first endpoint and the second endpoint of the longest vascular sub-fragment based on the optimal route algorithm. Similarly, the processing device 130 may determine the second centerline of the second-longest vascular sub-fragment by connecting the first endpoint and the second endpoint of the second-longest vascular sub-fragment based on the optimal route algorithm. The processing device 130 may determine the fragment centerline of the vascular fragment by connecting the first centerline of the longest vascular sub-fragment and the second centerline of the second-longest vascular sub-fragment based on the optimal route algorithm.

In the embodiments of the present disclosure, when a vascular fragment includes a plurality of vascular sub-fragments, the processing device 130 may determine a fragment centerline of the vascular fragment based on the longest vascular sub-fragment and the second-longest vascular sub-fragment of the vascular sub-fragments, thereby improving an efficiency of extracting a fragment centerline and ensuring an accuracy of the fragment centerline.

In 1104, the processing device 130 may generate the vascular centerline image based on the plurality of fragment centerlines.

In some embodiments, the processing device 130 may generate the vascular centerline image by performing connection operation and extension operation on the plurality of fragment centerlines. The connection operation may refer to generating one or more connected centerlines by connecting the fragment centerlines. The extension operation may refer to extending an endpoint of a connected centerline. In some embodiments, the processing device 130 may generate the vascular centerlines by connecting the fragment centerlines based on the initial vascular image and a pre-defined vascular connection strategy. The pre-defined vascular connection strategy may include a vascular connection rule. The vascular connection rule may define a manner of connecting a plurality of vascular fragments in different tissues or organs. For example, a complete arterial blood vessel may travel through a plurality of tissues or organs. A plurality of vascular fragments of the arterial blood vessel in the plurality of tissues or organs may be represented as a plurality of lines with different colors, and a connection order of the plurality of vascular fragments of the arterial blood vessel may be pre-defined.

In some embodiments, the processing device 130 may connect the fragment centerlines that are relevant to each other based on the initial vascular image and the vascular connection strategy to generate the vascular centerline image corresponding to the initial vascular image. The vascular centerline image may include at least one complete blood vessel.

In some embodiments, for a first blood vessel to be processed, the processing device 130 may determine two vascular fragments of the first blood vessel based on the connection order of the blood vessels in the vascular connection strategy. The processing device 130 may connect the fragment centerlines of the two vascular fragments using the optimal route algorithm based on the initial vascular image. The processing device 130 may generate a first vascular centerline corresponding to the first blood vessel when all of the fragment centerlines of the vascular fragments of the first blood vessel are connected based on the process mentioned above. After the first vascular centerline is determined, the processing device 130 may process a second blood vessel to generate a second vascular centerline of the second blood vessel. Similarly, the processing device 130 may generate the vascular centerline image based on the vascular centerlines determined by processing the blood vessels in sequence.

In the embodiments of the present disclosure, for each vascular fragment, the processing device 130 may extract a fragment centerline of the vascular fragment, and connect the fragment centerlines of the vascular fragments based on the initial vascular image and the pre-defined vascular connection strategy to generate a vascular centerline image corresponding to the initial vascular image, thereby improving an accuracy and efficiency of an extraction of a fragment centerline.

In some embodiments, the processing device 130 may determine one or more optimal routes configured to connect and extend the plurality of fragment centerlines based on the initial vascular image. The processing device 130 may also obtain one or more connected centerlines by connecting the plurality of fragment centerlines based on the one or more optimal routes. For each of the one or more connected centerlines, the processing device 130 may further extend a head-end and/or a tail-end of the connected centerline based on the one or more optimal route. The connected centerline may refer to a centerline after a plurality of fragment centerlines are connected.

In some embodiments, the processing device 130 may process the initial vascular image (e.g., the black blood image or the bright blood image) based on the optimal route algorithm or an optimal route model to determine the one or more optimal routes. For example, the processing device 130 may process the black blood image based on the optimal route algorithm directly. The processing device 130 may also input the black blood image into a trained optimal route model to determine the one or more optimal routes. The optimal route model may be determined based on a machine learning training method.

In some embodiments, the extending a connected centerline may refer to extending the head-end of the connected centerline and/or the tail-end of the connected centerline. For example, the processing device 130 may extend the head-end or the tail-end of the connected centerline based on the one or more optimal routes, or the processing device 130 may extend the head-end and the tail-end of the connected centerline at the same time.

Figure 12:
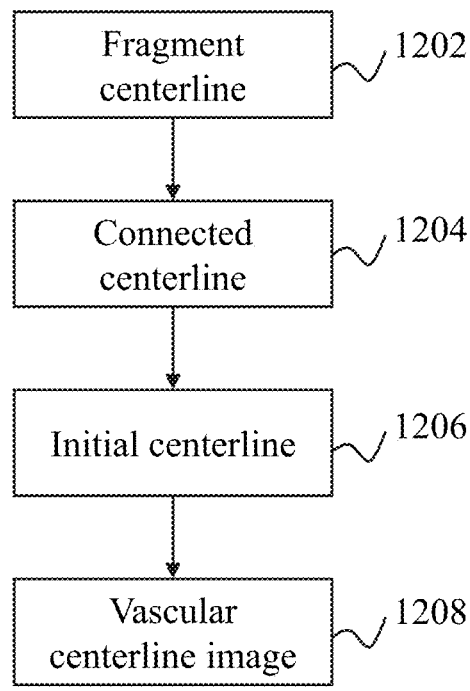
FIG. 12 is a flowchart illustrating an exemplary process for generating a vascular centerline image according to some embodiments of the present disclosure.

In some embodiments, one or more operations of the process 1200 may be performed to achieve at least part of operation 1104 as described in connection with FIG. 11. As shown in FIG. 12, the process 1200 may include the following operations. In some embodiments, the process 1200 may be performed by the second generating module 230 of the processing device 130.

In 1202, the processing device 130 may obtain a plurality of fragment centerlines in the vascular fragment image.

In 1204, the processing device 130 may obtain one or more connected centerlines by connecting the plurality of fragment centerlines.

In some embodiments, the processing device 130 may connect each pair of fragment centerlines corresponding to adjacent vascular fragments of a same blood vessel to generate a connected centerline. In some embodiments, the processing device 130 may connect the fragment centerlines based on the vascular connection strategy described in operation 1104, which is not repeated herein.

In 1206, the processing device 130 may determine one or more initial centerlines by extending the one or more connected centerlines.

In some embodiments, the processing device 130 may extend the one or more connected centerlines based on a preset length threshold to determine the one or more initial centerlines. The preset length threshold may be a default setting of a system (e.g., the vascular image processing system 100), or the preset length threshold may be determined based on a manual setting. The processing device 130 may also determine the preset length threshold based on actual requirements. In some embodiments, the processing device 130 may extend the one or more connected centerlines to boundaries of the initial vascular image directly to generate the one or more initial centerlines.

In 1208, the processing device 130 may determine one or more target centerlines of the initial vascular image based on the one or more initial centerlines and one or more branch points on the one or more initial centerlines, and generate the vascular centerline image based on the one or more target centerlines.

A branch point on an initial centerline may refer to a connection point of centerlines of different blood vessels. In some embodiments, the processing device 130 may determine the one or more branch points on the one or more initial centerlines based on the markers of the vascular fragments in the vascular fragment image. For example, for the black blood image, the processing device 130 may determine the branch point(s) on the initial centerline(s) corresponding to the black blood image based on the markers of the vascular fragments in the first vascular fragment image and the initial centerline(s) corresponding to the black blood image. In some embodiments, the processing device 130 may determine two or more branch points based on the vascular fragment image and the initial centerline(s). If a distance between two branch points is within a preset range, the processing device 130 may determine one of the two branch points as a target branch point.

In some embodiments, after the one or more branch points on the one or more initial centerlines are determined, the processing device 130 may determine the one or more target centerlines in the initial vascular image based on the one or more branch points on the one or more initial centerlines. For example, an initial centerline may be divided into multiple parts by one or more branch points, and the processing device 130 may determine the multiple parts of the initial centerlines as target centerlines. The one or more target centerlines may be one or more complete centerlines corresponding to one or more blood vessels. In some embodiments, the one or more target centerlines may be the centerlines of one or more specific blood vessels that a user are interested in. For example, the one or more target centerlines may be main centerlines in the initial vascular image, such as vascular centerlines corresponding to arteries, veins, etc. The one or more target centerlines may also be centerlines of the blood vessels in a target region (e.g., the liver, the cardiac, etc.) designated by a user. The processing device 130 may generate the vascular centerline image based on the one or more target centerlines in the initial vascular image directly. That is, the initial vascular image may include a plurality of target centerlines. Optionally, different vascular centerlines in the vascular centerline image may include different markers.

Figure 10A:
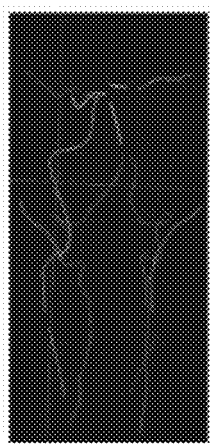
FIGS. 10A to 10D are schematic diagrams illustrating an exemplary process for determining target centerlines according to some embodiments of the present disclosure.
Figure 10B:
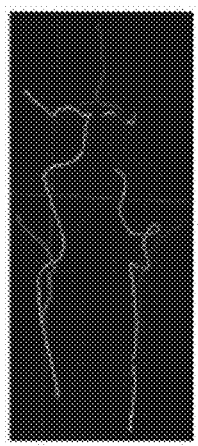
Figure 10C:
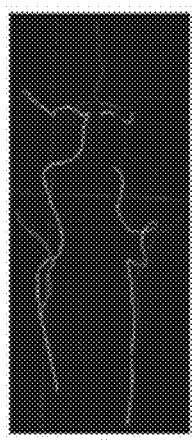
Figure 10D:
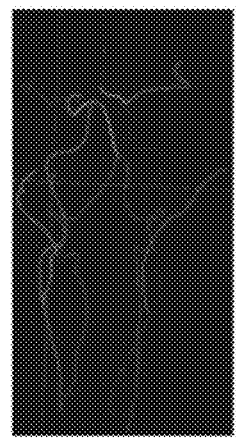

Merely by way of example, the fragment centerlines in an exemplary fused vascular fragment image are shown in FIG. 10A. One or more exemplary connected centerlines are shown in FIG. 10B. One or more exemplary extended connected centerlines (i.e., the one or more initial centerlines) are shown in FIG. 10C. One or more exemplary target centerlines (i.e., the vascular centerline image) corresponding to the black blood image or the bright blood image determined based on the one or more initial centerlines are shown in FIG. 10D.

In some embodiments, after the one or more target centerlines are determined, the processing device 130 may obtain a plurality of vascular sectional images corresponding to a plurality of sectional points on the one or more target centerlines. For each of the plurality of vascular sectional images, the processing device 130 may perform a segmentation operation on the vascular sectional image to obtain a contour of the vascular lumen and a contour of the vascular wall. The processing device 130 may determine whether plaques exist in a blood vessel of the initial vascular image by analyzing the contour of the vascular lumen and the contour of the vascular wall. In response to determining that a plaque exists in a blood vessel of the initial vascular image, the processing device 130 may segment the plaque from the initial vascular image. Alternatively, the processing device 130 may determine components of the plaque, an area of the plaque, a volume of the plaque, etc., by analyzing the plaque.

FIG. 13 is a flowchart illustrating an exemplary process for generating a vascular centerline fragment image according to some embodiments of the present disclosure. In some embodiments, a process 1300 may be performed following the process 300 as described in connection with FIG. 3. In some embodiments, the process 1300 may be performed by the second generating module 230 of the processing device 130.

In some embodiments, the processing device 130 may generate the vascular centerline fragment image based on the vascular fragment image and the vascular centerline image corresponding to the initial vascular image. The vascular fragment image may include a plurality of vascular fragments, and the plurality of vascular fragments may belong to different types of blood vessels. The processing device 130 may connect a plurality of fragment centerlines belonging to the same blood vessel to obtain a plurality of complete vascular centerlines (i.e., target vascular centerlines) corresponding to a plurality of blood vessels (i.e., generate the vascular centerline image). The processing device 130 may perform a fragmentation operation on each of the plurality of complete vascular centerlines in the vascular centerline image to obtain the vascular centerline fragment image corresponding to the vascular fragment image. Each of the fragment centerlines in the vascular centerline fragment image may correspond to one of the vascular fragments in the vascular fragment image. Compared with determining the fragment centerlines based on the initial vascular image and the vascular fragment image, the fragment centerlines determined based on the vascular centerline image and the vascular fragment image may be more complete, and a better connection performance between two fragment centerlines can be achieved. The vascular centerline fragment image may ensure a completeness of the blood vessels and accurately reflect a distribution of the vascular fragments of each blood vessel in different tissues or organs.

In some embodiments, the processing device 130 may generate the vascular centerline fragment image by performing the process 1300 as below.

In 1302, the processing device 130 may determine at least one vascular branch point based on the vascular centerline image and the vascular fragment image.

In some embodiments, the vascular branch point(s) may be a connection point of different vascular fragments. The processing device 130 may perform a vascular fragmentation operation on a plurality of blood vessels in the vascular centerline image based on the vascular branch point(s). In some embodiments, the processing device 130 may determine a vascular centerline corresponding to each vascular fragment in the vascular centerline image based on the vascular fragment image. The processing device 130 may also determine a connection point between vascular centerlines of different vascular fragments, and determine the connection point as a vascular branch point. Based on a plurality of vascular fragments and a plurality of vascular centerlines corresponding to the plurality of vascular fragments, a plurality of vascular branch points may be determined.

In some embodiments, the processing device 130 may determine a plurality of branch points in the vascular fragment image and a plurality of branch points in the vascular centerline image. The processing device 130 may compare the plurality of branch points in the vascular fragment image and the plurality of branch points in the vascular centerline image to determine a plurality of vascular branch points that are used to perform the fragmentation operation on the vascular centerline image.

In some embodiments, the processing device 130 may determine a position of a first branch point in the vascular fragment image and a position of a second branch point in the vascular centerline image. The first branch point and the second branch point may be branch points corresponding to the same vascular fragment in the vascular fragment image and the vascular centerline image. The processing device

130 may determine whether the position of the second branch point is within a preset range from the position of the first branch point. In response to determining that the position of the second branch point is within the preset range, the processing device 130 may determine the second branch point as one vascular branch point. In such cases, a connection between a plurality of blood vessels in the vascular fragment image may be substantially consistent with a connection between a plurality of blood vessels in the vascular centerline image, which also indicates that the vascular centerlines in the vascular centerline image have a high matching degree with the blood vessels in the initial vascular image. Therefore, the processing device 130 may determine the second branch point in the vascular centerline image as a vascular branch point that is used to perform the fragmentation operation on the vascular centerline image.

In some embodiments, if it is determined that the position of the second branch point is not within the preset range, it may indicate that the vascular centerlines in the vascular centerline image are not consistent with the plurality of blood vessels in the initial vascular image (e.g., the black blood image). In such cases the processing device 130 may determine an adjusted vascular centerline image by re-connecting the fragment centerlines in the vascular fragment image based on the initial vascular image and the vascular connection strategy again. The processing device 130 may determine a position of a new second branch point in the adjusted vascular centerline image and determine whether the position of the ew second branch point is within the preset range from the position of the first branch point. In response to determining that the position of the new second branch point is within the preset range, the processing device 130 may determine the new second branch point in the adjusted vascular centerline image as the vascular branch point. In response to determining that the position of the new second branch point is not within the preset range, the processing device 130 may further determine an adjusted vascular centerline image based on the process mentioned above until the position of the newly second branch point is within the preset range.

In 1304, the processing device 130 may generate a vascular centerline fragment image by performing a fragmentation operation on each vascular centerline in the vascular centerline image based on the at least one vascular branch point.

Each vascular centerline in the vascular centerline fragment image may include a plurality of centerline fragments, and the plurality of centerline fragments may correspond to different types of blood vessels. For example, the plurality of centerline fragments in the vascular centerline fragment image may include a plurality of fragment marker corresponding to the plurality of centerline fragments, respectively.

In some embodiments, the processing device 130 may mark the plurality of centerline fragments in the vascular centerline fragment image. For example, the processing device 130 may determine a part of a vascular centerline between two vascular branch points as a centerline fragment. The processing device 130 may mark different centerline fragments with different colors, numbers, lines with different thickness, etc. Merely by way of example, if A1, A2, A3, and A4 are vascular branch points, and A1 and A2 are connected by a part of a vascular centerline, A2 and A3 are connected by a part of a vascular centerline, and A3 and A4 are connected by a part of a vascular centerline, the processing device 130 may mark the vascular centerlines corresponding to the A1-A2, A2-A3, and A3-A4, respectively. For instance, the vascular centerline corresponding to the A1-A2 may be marked with a color of red, the vascular centerline corresponding to the A2-A3 may be marked with a color of blue, and the part of the vascular centerline corresponding to the A3-A4 may be marked with a color of green, to indicate different centerline fragments.

In some embodiments, the processing device 130 may mark the centerline fragments in the vascular centerline fragment image in a similar manner to the vascular fragment image, so that the vascular centerline fragment image may be consistent with the vascular fragment image, thereby allowing a user to view a distribution of different blood vessels in different tissues or organs in an intuitive manner and improving the user experience.

In some embodiments, before the at least one vascular branch point is determined, the processing device 130 may generate a processed vascular centerline image by extending each vascular centerline in the vascular centerline image based on the initial vascular image. Since some blood vessels at the boundaries of the vascular fragment image may be missing due to errors of the first vascular fragmentation model may occur, or a vascular centerline generated by connecting the fragment centerlines of the longest vascular fragment and the second-longest vascular fragment may be incomplete, the processing device 130 may generate a complete vascular centerline image and a complete vascular centerline fragment image based on the extension operation mentioned above.

In some embodiments, the processing device 130 may extend two ends of each vascular centerline with a preset length. The processing device 130 may extend two ends of each vascular centerline with a preset length based on a blood flow direction at the two ends. It should be noted that an extension manner and an extension length of a vascular centerline are not limited in the present disclosure.

Figure 14:
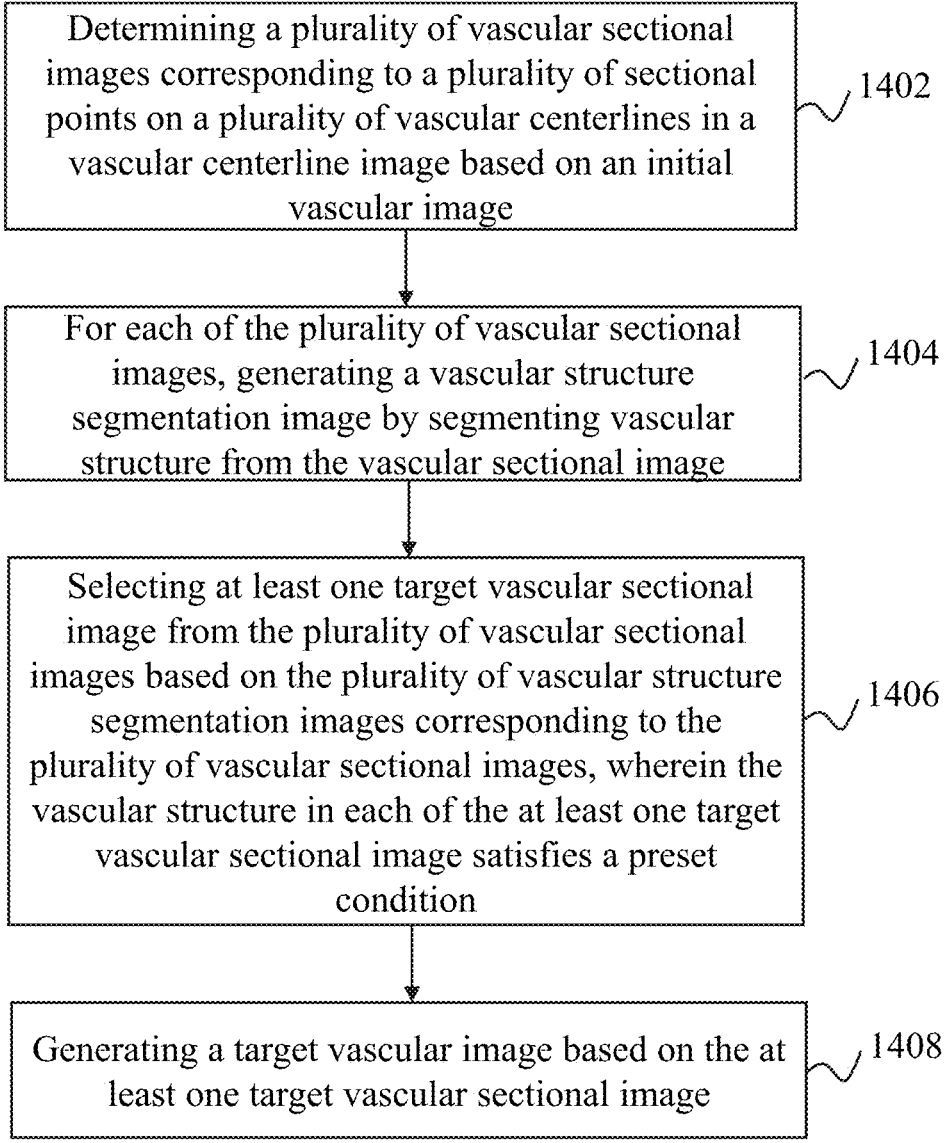
FIG. 14 is a flowchart illustrating an exemplary process for generating a target vascular image according to some embodiments of the present disclosure.

FIG. 14 is a flowchart illustrating an exemplary process for generating a target vascular image according to some embodiments of the present disclosure. In some embodiments, a process 1400 may be performed after the process 300 as described in connection with FIG. 3. In some embodiments, the process 1400 may be performed by the fourth generating module 250 of the processing device 130.

In 1402, the processing device 130 may determine a plurality of vascular sectional images corresponding to a plurality of sectional points on a plurality of vascular centerlines in the vascular centerline image based on the initial vascular image.

In some embodiments, for each of the plurality of vascular centerlines in the vascular centerline image, the processing device 130 may determine a plurality of sectional points on the vascular centerline. A distance between adjacent sectional points may be less than or equal to a preset distance threshold. For example, the distance between adjacent sectional points may be less than or equal to 0.7 mm, 0.5 mm, etc.

In some embodiments, the processing device 130 may perform an interpolation operation on each vascular centerline based on an interpolation algorithm to determine the plurality of sectional points on the vascular centerline. The processing device 130 may obtain a vascular sectional image corresponding to each sectional point based on the initial vascular image.

More details about obtaining vascular sectional images may be found elsewhere in the present disclosure, which is not repeated herein.

In 1404, for each of the plurality of vascular sectional images, the processing device 130 may generate a vascular structure segmentation image by segmenting vascular structure from the vascular sectional image.

The vascular structure segmentation image may refer to an image generated by segmenting the vascular structure from the vascular sectional image. For example, the vascular structure segmentation image may include vascular structure, such as the vascular wall and the vascular lumen. In some embodiments, the vascular structure segmentation image may be the same as or different from the vascular wall segmentation image mentioned above. For example, when the vascular wall segmentation image merely includes the vascular wall and the vascular lumen, the vascular wall segmentation image may be the same as the vascular structure segmentation image. A segmentation of the vascular structure may be achieved based on a segmentation algorithm or a vascular structure segmentation model, which is not limited herein.

In 1406, the processing device 130 may select at least one target vascular sectional image from the plurality of vascular sectional images based on the plurality of vascular structure segmentation images corresponding to the plurality of vascular sectional images. The vascular structure in each of the at least one target vascular sectional image may satisfy a preset condition.

A target vascular sectional image may refer to a vascular sectional image in which the vascular structure satisfies a preset condition. The preset condition may include but not limited to that the contour of the vascular lumen does not exceeding the contour of the vascular wall, that the size of the vascular lumen is within a first preset range, that the size of the vascular wall is within a second preset range, that the distance between the vascular lumen and the vascular wall is within a third preset range, or the like. The first preset range, the second preset range, and the third preset range may be determined based on actual requirements, which is not limited herein.

In some embodiments, when a vascular sectional image does not satisfy the preset condition, the processing device 130 may adjust the vascular sectional image to generate a vascular sectional image satisfying the preset condition (i.e., a target vascular sectional image). In some embodiments, the processing device 130 may discard a vascular sectional image not satisfying the preset condition.

In 1408, the processing device 130 may generate a target vascular image based on the at least one target vascular sectional image.

The target vascular image may refer to a 3D vascular image generated based on the at least one target vascular sectional image.

In some embodiments, the processing device 130 may generate the target vascular image by performing a filling operation on the at least one target vascular sectional image. For example, the processing device 130 may generate the target vascular image by filling pixels or voxels between adjacent target vascular sectional images. Merely by way of example, the processing device 130 may perform a first filling operation between adjacent target vascular sectional images to generate an intermediate vascular image. A position in the intermediate vascular image that corresponds to a vascular sectional image not satisfying the preset condition may include a vascular gap. The processing device 130 may perform a second filling operation on the position including the vascular gap to generate the target vascular image. The first filling operation and the second filling operation may be the same or different.

In some embodiments, before generating the target vascular image by performing the second filling operation on the intermediate vascular image, for a missing vascular sectional image (i.e., a discarded vascular sectional image not satisfying the preset condition) in the intermediate vascular image, the processing device 130 may determine a new vascular sectional image based on an interpolation algorithm. The processing device 130 may interpolate the new vascular sectional image into the position including the vascular gap in the intermediate vascular image to generate an interpolated intermediate vascular image. The processing device 130 may then perform the second filling operation on the interpolated intermediate vascular image to generate the target vascular image.

In some embodiments, after the second filling operation is performed on the interpolated intermediate vascular image, the processing device 130 may perform post-processing on the filled intermediate vascular image to generate the target vascular image. Optionally, the subsequent process may include removing non-vascular points on a surface of a blood vessel, preforming a smoothing operation on the surface of the blood vessel, etc., to improve a smoothness of the surface of the blood vessel.

In the embodiments of the present disclosure, the processing device 130 may generate the target vascular image based on the initial vascular image and the vascular centerline image. The target vascular image may display a morphology and distribution of blood vessels in the initial vascular image in an intuitive manner, and improve viewing experience of a user.

In some embodiments, the processing device 130 may perform the vascular fragmentation operation on each blood vessel in the target vascular image based on the branch points of the blood vessels to generate a target vascular fragment image corresponding to the target vascular image. Compared with the vascular fragment image, the morphology of each vascular fragment in the target vascular fragment image may be matched with a standard vascular structure better. The surface of the blood vessels may be smoother, a connection performance of relevant vascular fragments may be better, and the extraction performance of the blood vessels may be improved.

Figure 15:
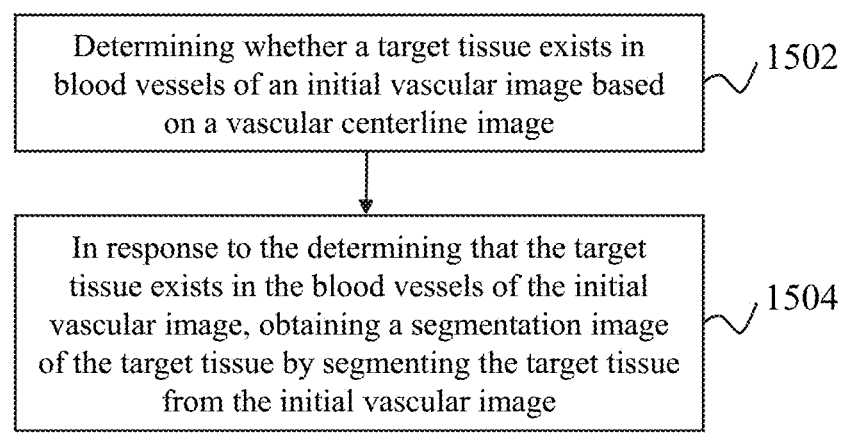
FIG. 15 is a flowchart illustrating an exemplary process for obtaining a segmentation image of a target tissue according to some embodiments of the present disclosure.

FIG. 15 is a flowchart illustrating an exemplary process for obtaining a segmentation image of a target tissue according to some embodiments of the present disclosure. In some embodiments, a process 1500 may be performed after the process 300 as described in connection with FIG. 3. In some embodiments, the process 1500 may be performed by the segmenting module 260 of the processing device 130.

In 1502, the processing device 130 may determine whether a target tissue exists in blood vessels of the initial vascular image based on the vascular centerline image.

The target tissue may refer to possible abnormal portions or structures in the blood vessels. For example, the target tissue may include a plaque, a stenosis region, etc. In some embodiments, the processing device 130 may determine whether the target tissue exists in the blood vessels of the initial vascular image (e.g., the black blood image) by detecting the plaque, the stenosis region, etc., based on the vascular centerline image.

For example, the processing device 130 may segmenting the blood vessels from the initial vascular image based on the vascular centerline image, and analyze and detect the segmented blood vessels to determine whether the target tissue exists. For instance, the processing device 130 may analyze the segmented blood vessels layer by layer and extract the vascular sectional images of each layer of the blood vessels. The processing device 130 may determine the vascular lumen and the vascular wall by performing the segmentation operation on the vascular sectional images of the each layer. The processing device 130 may recognize the stenosis region by analyzing diameters of the vascular lumen and the vascular wall. Additionally or alternatively, the processing device 130 may recognize the components of the stenosis region between the vascular lumen and the vascular wall, and determine whether the target tissue exists on the stenosis region based on the recognition result. For example, the processing device 130 may segment the target tissue based on a target segmentation algorithm, a target segmentation model, or the like.

In 1504, in response to the determining that the target tissue exists in the blood vessels of the initial vascular image, the processing device 130 may obtain a segmentation image of the target tissue by segmenting the target tissue from the initial vascular image.

In some embodiments, in response to the determining that the target tissue exists in the blood vessels of the initial vascular image, the processing device 130 may segment the target tissue from the initial vascular image based on a preset target tissue segmentation model to generate a segmentation result of the target tissue. The target tissue segmentation model may be obtained by training a preliminary segmentation network based on a plurality of sample images including the target tissue and a ground truth segmentation image of the target tissue corresponding to each of the plurality of sample images. The target tissue segmentation model may be any types of deep-learning networks, which is not limited herein.

In the embodiments of the present disclosure, the processing device 130 may detect whether the target tissue exists in the blood vessels of the initial vascular image based on the vascular centerline image, and generate the segmentation result of the target tissue in response to determining that the target tissue exists in the blood vessels of the initial vascular image. A detection and segmentation operation performed on the target tissue in the present disclosure may be achieved merely based on an initial vascular image (e.g., a black blood image). That is, an extraction of the vascular centerlines and a detection of the target tissue may be achieved by obtaining only one type of initial vascular image of the subject, which is an efficient and a real-time process with high detection accuracy.

In some embodiments, a process of obtaining the vascular centerlines may include the following operations: (1) as shown in FIG. 18A, the processing device 130 may obtain an initial black blood image of a subject and input the initial black blood image into a first vascular fragmentation model. The first vascular fragmentation model may determine a first vascular fragment image including at least one vascular fragment corresponding to the initial black blood image; (2) as shown in FIG. 18B, for each of the at least one vascular fragment in the first vascular fragment image, the processing device 130 may extract a fragment centerline of the vascular fragment; (3) as shown in FIG. 18C, the processing device 130 may connect each fragment centerline based on the initial black blood image and a preset vascular connection strategy to generate a vascular centerline image corresponding to the initial black blood image; (4) as shown in FIG. 18D, the processing device 130 may extend the each fragment centerline to generate a vascular centerline image after the extension operation; (5) as shown in FIG. 18E, the processing device 130 may determine at least one vascular branch point based on the vascular centerline image and the first vascular fragment image. The processing device 130 may also perform a fragmentation operation on each vascular centerline in the vascular centerline image based on the at least one vascular branch point to generate a vascular centerline fragment image; (6) as shown in FIG. 18F, the processing device 130 may determine a plurality of sectional points on each vascular centerline in the vascular centerline image based on an interpolation operation; (7) as shown in FIG. 18G, the processing device 130 may determine a plurality of vascular sectional images corresponding to the plurality of sectional points on the each vascular centerline in the vascular centerline image based on the initial black blood image. The processing device 130 may determine whether a vascular structure in the plurality of vascular sectional images satisfies a preset condition. The processing device 130 may remove a vascular sectional image not satisfying the preset condition and reserve a vascular sectional image satisfying the preset condition to generate an intermediate vascular image; (8) as shown in FIG. 18H, the processing device 130 may determine a new vascular sectional image corresponding to a position including a vascular gap in the intermediate vascular image based on a interpolation algorithm. The processing device 130 may interpolate the new vascular sectional image into the position including the vascular gap in the intermediate vascular image to generate an interpolated intermediate vascular image. The processing device 130 may perform a filling operation on the interpolated intermediate vascular image to generate a target vascular image; (9) as shown in FIG. 18I, the processing device 130 may generate a processed target vascular image by performing post-processing on the target vascular image (e.g., removing non-vascular points on a surface of a blood vessel); (10) as shown in FIG. 18J, the processing device 130 may generate a target vascular fragment image by performing the fragmentation operation on the target vascular image based on the at least one vascular branch point.

In some embodiments of the present disclosure, an acquisition of a centerline fragmentation result, a centerline extraction result, a vascular extraction result, a contour extraction result, a plaque detection result, a plaque segmentation result, etc., can be achieved in an automatic manner and repeated by a computing device, thereby improving an efficiency of extracting a centerline and simplifying a process of extracting a centerline. In addition, a fully automated plaque processing process can be achieved based on a single sequence (e.g., the black blood image), which is easy to implement and does not depend on registration.

It should be noted that the above description regarding a process (e.g., the process 300, the process 400, etc.) is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, a process described above may be accomplished with one or more additional operations not described, and/or without one or more of the operations discussed. Additionally, the order in which the operations of the process described above is not intended to be limiting. In some embodiments, a process described above may be implemented in the vascular image processing system 100 illustrated in FIG. 1. For example, the process may be stored in the storage device (not shown in the figures) in the form of instructions (e.g., an application), and invoked and/or executed by the processing device 130.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±1%, ±5%, ±10%, or ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for image processing, comprising:
obtaining an initial vascular image;
generating a vascular fragment image by performing a vascular fragmentation operation on the initial vascular image; and
generating, based on the vascular fragment image, a vascular centerline image;
wherein the initial vascular image includes a black blood image and a bright blood image,
the generating a vascular fragment image by performing a vascular fragmentation operation on the initial vascular image includes: generating a first vascular fragment image by performing the vascular fragmentation operation on the black blood image; and generating a second vascular fragment image by performing the vascular fragmentation operation on the bright blood image, and
the generating, based on the vascular fragment image, a vascular centerline image includes: generating, based on the first vascular fragment image and the second vascular fragment image, a fused vascular fragment image; and generating, based on the fused vascular fragment image, a vascular centerline image of at least one of the black blood image or the bright blood image.

2. The method of claim 1, wherein
the generating a first vascular fragment image by performing the vascular fragmentation operation on the black blood image includes: generating the first vascular fragment image by processing the black blood image based on a first vascular fragmentation model; and/or
the generating a second vascular fragment image by performing the vascular fragmentation operation on the bright blood image includes: generating the second vascular fragment image by processing the bright blood image based on the first vascular fragmentation model.

3. The method of claim 1, further including:
determining, based on the vascular centerline image and the at least one of the black blood image and the bright blood image, a plurality of vascular sectional images corresponding to a plurality of vascular sections; and
for each of the plurality of vascular sections, generating a vascular wall segmentation image by processing the vascular sectional image of the vascular section based on a vascular wall segmentation model, and
generating, based on the vascular wall segmentation image corresponding to each of the plurality of vascular sections, a three-dimensional vascular wall image.

4. The method of claim 3, wherein the determining, based on the vascular centerline image and the at least one of the black blood image and the bright blood image, a plurality of vascular sectional images corresponding to a plurality of vascular sections includes:

determining, based on the vascular centerline image, a plurality of sectional points on at least one vascular centerline in the at least one of the black blood image and the bright blood image; and
for each of the plurality of sectional points,
determining one or more neighbor pixels of the sectional point in the at least one of the black blood image and the bright blood image, and
determining, based on the one or more neighbor pixels of the sectional point, the vascular sectional image corresponding to the vascular section where the sectional point is located.

5. The method of claim 4, wherein the generating, based on the vascular wall segmentation image corresponding to the vascular section, a three-dimensional vascular wall image includes:
for the each of the plurality of vascular sections, reconstructing, based on the vascular wall segmentation image of the vascular section, a two-dimensional vascular wall image corresponding to the vascular section;
for each of a plurality of pairs of adjacent vascular sections of the plurality of vascular sections, generating, based on two-dimensional vascular wall images corresponding to the pair of adjacent vascular sections, an initial three-dimensional vascular wall image; and
generating, based on the initial three-dimensional vascular wall images of the plurality of pairs of the adjacent vascular sections, the three-dimensional vascular wall image.

6. The method of claim 1, wherein the generating, based on the first vascular fragment image and the second vascular fragment image, a fused vascular fragment image includes:
obtaining reference information relating to vascular architecture;
performing, based on the reference information, a correction operation on the first vascular fragment image and the second vascular fragment image; and
generating, based on a corrected first vascular fragment image and a corrected second vascular fragment image, the fused vascular fragment image.

7. The method of claim 1, wherein
the fused vascular fragment image is generated by processing the black blood image and the bright blood image based on a second vascular fragmentation model.

8. The method of claim 1, wherein the generating, based on the fused vascular fragment image, a vascular centerline image of at least one of the black blood image or the bright blood image comprises:
extracting a plurality of fragment centerlines of the plurality of vascular fragments of the fused vascular fragment image; and
generating, based on the plurality of fragment centerlines, the vascular centerline image.

9. The method of claim 8, wherein the generating, based on the plurality of fragment centerlines, the vascular centerline image includes:
determining, based on the at least one of the black blood image or the bright blood image, one or more optimal routes configured to connect and extend the plurality of fragment centerlines;
obtaining one or more connected centerlines by connecting the plurality of fragment centerlines based on the one or more optimal routes; and
for each of the one or more connected centerlines, extending, based on the one or more optimal route, a head-end and a tail-end of the connected centerline.

10. The method of claim 1, further including:
determining, based on the vascular centerline image and the vascular fragment image, at least one vascular branch point; and
generating a vascular centerline fragment image by performing a fragmentation operation on each vascular centerline in the vascular centerline image based on the at least one vascular branch point.

11. The method of claim 1, further including:
determining, based on the at least one of the black blood image and the bright blood image, a plurality of vascular sectional images corresponding to a plurality of sectional points on a plurality of vascular centerlines in the vascular centerline image;
for each of the plurality of vascular sectional images, generating a vascular structure segmentation image by segmenting vascular structure from the vascular sectional image;
selecting, based on the plurality of vascular structure segmentation images corresponding to the plurality of vascular sectional images, at least one target vascular sectional image from the plurality of vascular sectional images, the vascular structure in each of the at least one target vascular sectional image satisfying a preset condition; and
generating, based on the at least one target vascular sectional image, a target vascular image.

12. The method of claim 1, further including:
determining, based on the vascular centerline image, whether a target tissue exists in blood vessels of the at least one of the black blood image and the bright blood image; and
in response to the determining that the target tissue exists in the blood vessels of the at least one of the black blood image and the bright blood image, obtaining a segmentation image of the target tissue by segmenting the target tissue from the at least one of the black blood image or the bright blood image.

13. A system for image processing, comprising:
at least one storage device including a set of instructions; and
at least one processor configured to communicate with the at least one storage device, wherein when executing the set of instructions, the at least one processor is configured to direct the system to perform operations including:
obtaining an initial vascular image;
generating a vascular fragment image by performing a vascular fragmentation operation on the initial vascular image; and
generating, based on the vascular fragment image, a vascular centerline image;
wherein the initial vascular image includes a black blood image and a bright blood image,
the generating a vascular fragment image by performing a vascular fragmentation operation on the initial vascular image includes: generating a first vascular fragment image by performing the vascular fragmentation operation on the black blood image; and generating a second vascular fragment image by performing the vascular fragmentation operation on the bright blood image, and
the generating, based on the vascular fragment image, a vascular centerline image includes: generating, based on the first vascular fragment image and the second vascular fragment image, a fused vascular fragment image; and generating, based on the fused vascular fragment image, a vascular centerline image of at least one of the black blood image or the bright blood image.

14. The system of claim 13, the operations further including:
determining, based on the vascular centerline image and the at least one of the black blood image and the bright blood image, a plurality of vascular sectional images corresponding to a plurality of vascular sections; and
for each of the plurality of vascular sections, generating a vascular wall segmentation image by processing the vascular sectional image of the vascular section based on a vascular wall segmentation model, and
generating, based on the vascular wall segmentation image corresponding to each of the plurality of vascular sections, a three-dimensional vascular wall image.

15. The system of claim 14, wherein the determining, based on the vascular centerline image and the at least one of the black blood image and the bright blood image, a plurality of vascular sectional images corresponding to a plurality of vascular sections includes:
determining, based on the vascular centerline image, a plurality of sectional points on at least one vascular centerline in the at least one of the black blood image and the bright blood image; and
for each of the plurality of sectional points,
determining one or more neighbor pixels of the sectional point in the at least one of the black blood image and the bright blood image, and
determining, based on the one or more neighbor pixels of the sectional point, the vascular sectional image corresponding to the vascular section where the sectional point is located.

16. The system of claim 13, wherein the generating, based on the fused vascular fragment image, a vascular centerline image of at least one of the black blood image or the bright blood image comprises:
extracting a plurality of segment centerlines of the plurality of vascular fragments of the fused vascular fragment image; and
generating, based on the plurality of segment centerlines, the vascular centerline image.

17. The system of claim 16, wherein the generating, based on the plurality of segment centerlines, the vascular centerline image includes:
determining, based on the at least one of the black blood image and the bright blood image, one or more optimal routes configured to connect and extend the plurality of segment centerlines;
obtaining one or more connected centerlines by connecting the plurality of segment centerlines based on the one or more optimal routes; and
for each of the one or more connected centerlines, extending, based on the one or more optimal route, a head-end and a tail-end of the connected centerline.

18. The system of claim 13, the operations further including:
determining, based on the vascular centerline image and the vascular fragment image, at least one vascular branch point; and
generating a vascular centerline fragment image by performing a fragmentation operation on each vascular centerline in the vascular centerline image based on the at least one vascular branch point.

19. The system of claim 13, wherein
the generating a first vascular fragment image by performing the vascular fragmentation operation on the black blood image includes: generating the first vascular fragment image by processing the black blood image based on a first vascular fragmentation model; and/or the generating a second vascular fragment image by performing the vascular fragmentation operation on the bright blood image includes: generating the second vascular fragment image by processing the bright blood image based on the first vascular fragmentation model.

20. A non-transitory computer readable medium, comprising a set of instructions for image processing, wherein when executed by at least one processor, the set of instructions direct the at least one processor to effectuate a method, the method comprising:

obtaining an initial vascular image;

generating a vascular fragment image by performing a vascular fragmentation operation on the initial vascular image; and generating, based on the vascular fragment image, a vascular centerline image;

wherein the initial vascular image includes a black blood image and a bright blood image, the generating a vascular fragment image by performing a vascular fragmentation operation on the initial vascular image includes: generating a first vascular fragment image by performing the vascular fragmentation operation on the black blood image; and generating a second vascular fragment image by performing the vascular fragmentation operation on the bright blood image, and the generating, based on the vascular fragment image, a vascular centerline image includes: generating, based on the first vascular fragment image and the second vascular fragment image, a fused vascular fragment image; and generating, based on the fused vascular fragment image, a vascular centerline image of at least one of the black blood image or the bright blood image.

* * * * *